United States Patent
Ishibe et al.

(10) Patent No.: US 6,646,679 B2
(45) Date of Patent: Nov. 11, 2003

(54) STILL IMAGE REPRODUCING APPARATUS SAVING TIME FOR STILL IMAGE REPRODUCTION

(75) Inventors: Hiroshi Ishibe, Kyoto (JP); Manabu Inoue, Kobe (JP); Katsuyuki Nanba, Osakasayama (JP); Hirokazu Yagura, Sakai (JP); Takehiro Katoh, Nara (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 08/474,903

(22) Filed: Jun. 7, 1995

(65) Prior Publication Data

US 2003/0011675 A1 Jan. 16, 2003

Related U.S. Application Data

(62) Division of application No. 08/430,244, filed on Apr. 28, 1995, now abandoned, which is a continuation of application No. 07/979,783, filed on Nov. 20, 1992, now abandoned.

(30) Foreign Application Priority Data

| Nov. 22, 1991 | (JP) | 3-307854 |
| Nov. 22, 1991 | (JP) | 3-308060 |
| Nov. 22, 1991 | (JP) | 3-308061 |
| Nov. 25, 1991 | (JP) | 3-309305 |
| Nov. 25, 1991 | (JP) | 3-309306 |
| Nov. 29, 1991 | (JP) | 3-317121 |

(51) Int. Cl.$^7$ ............................................. H04N 5/225
(52) U.S. Cl. .................. 348/207.99; 348/96; 348/333.12
(58) Field of Search .......................... 348/96, 97, 105, 348/110, 207, 222.1, 207.99, 231.99, 231.3, 231.6, 333.01, 333.02, 333.11, 333.12; 358/487, 527; H04N 5/235

(56) References Cited

U.S. PATENT DOCUMENTS

| 4,482,924 A | * | 11/1984 | Brownstein |
| 4,485,406 A | * | 11/1984 | Brownstein |
| 4,603,966 A | * | 8/1986 | Brownstein |
| 4,991,004 A | * | 2/1991 | Hayashi et al. |
| 5,038,167 A | * | 8/1991 | Suzuki |
| 5,043,758 A | * | 8/1991 | Nealon |
| 5,258,859 A | | 11/1993 | Wada et al. |
| 5,546,122 A | * | 8/1996 | Asami et al. ................. 348/96 |
| 6,278,484 B1 | * | 8/2001 | Oosaka et al. ................ 348/96 |

FOREIGN PATENT DOCUMENTS

| JP | 48-17214 | 3/1973 | |
| JP | 50156433 | 12/1975 | |
| JP | 53133322 A | 11/1978 | |
| JP | 53-133322 | 11/1978 | |
| JP | 58182384 A | 10/1983 | |
| JP | 02048871 A | 2/1990 | |
| JP | 02071680 A | 3/1990 | |
| JP | 2-171087 | * 7/1990 | .......... H04N/5/253 |
| JP | 02195780 A | 8/1990 | |
| JP | 3-36286 | 4/1991 | |
| JP | 3-128582 | 5/1991 | .......... H40N/5/253 |
| JP | 03217978 A | 9/1991 | |
| JP | 03224369 A | 10/1991 | |
| JP | 03259232 A | 11/1991 | |

* cited by examiner

Primary Examiner—Tuan Ho
(74) Attorney, Agent, or Firm—Burns, Doane, Swecker & Mathis, LLP

(57) ABSTRACT

A compact film player has a picture reproducing unit and an information reading unit capable of reading a photographing information on each frame of the film. When a developed film is fed in an inlet of the picture reproducing unit in a prescribed direction, a scan mirror scans a picture provided on the film perpendicularly to the feed direction, so that a line sensor takes the picture every line. The line sensor and the scan mirror read two-dimensional pictures provided on the film. When the picture of the frame previously read is on display, the scan of the next frame is effected.

32 Claims, 29 Drawing Sheets

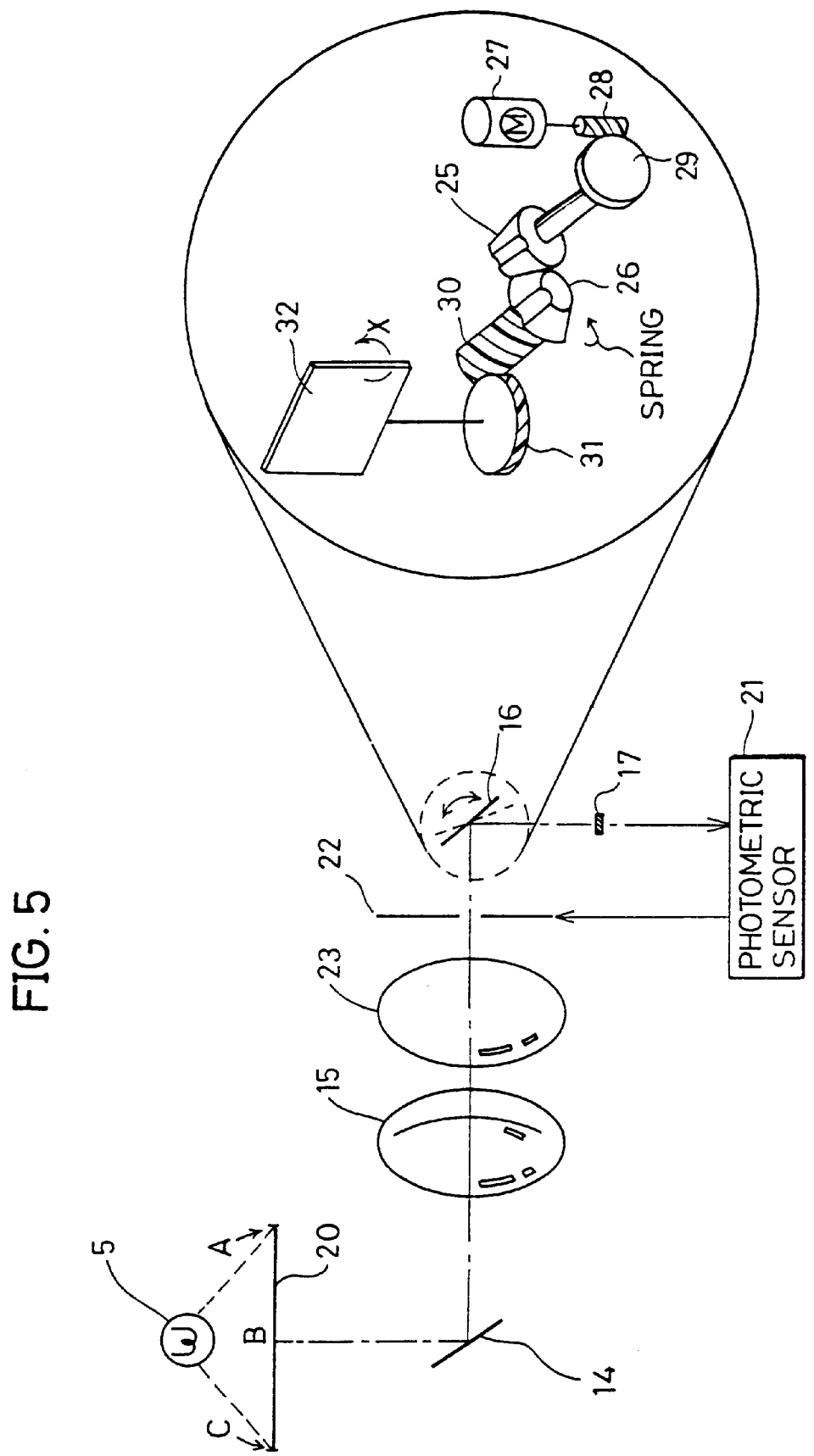

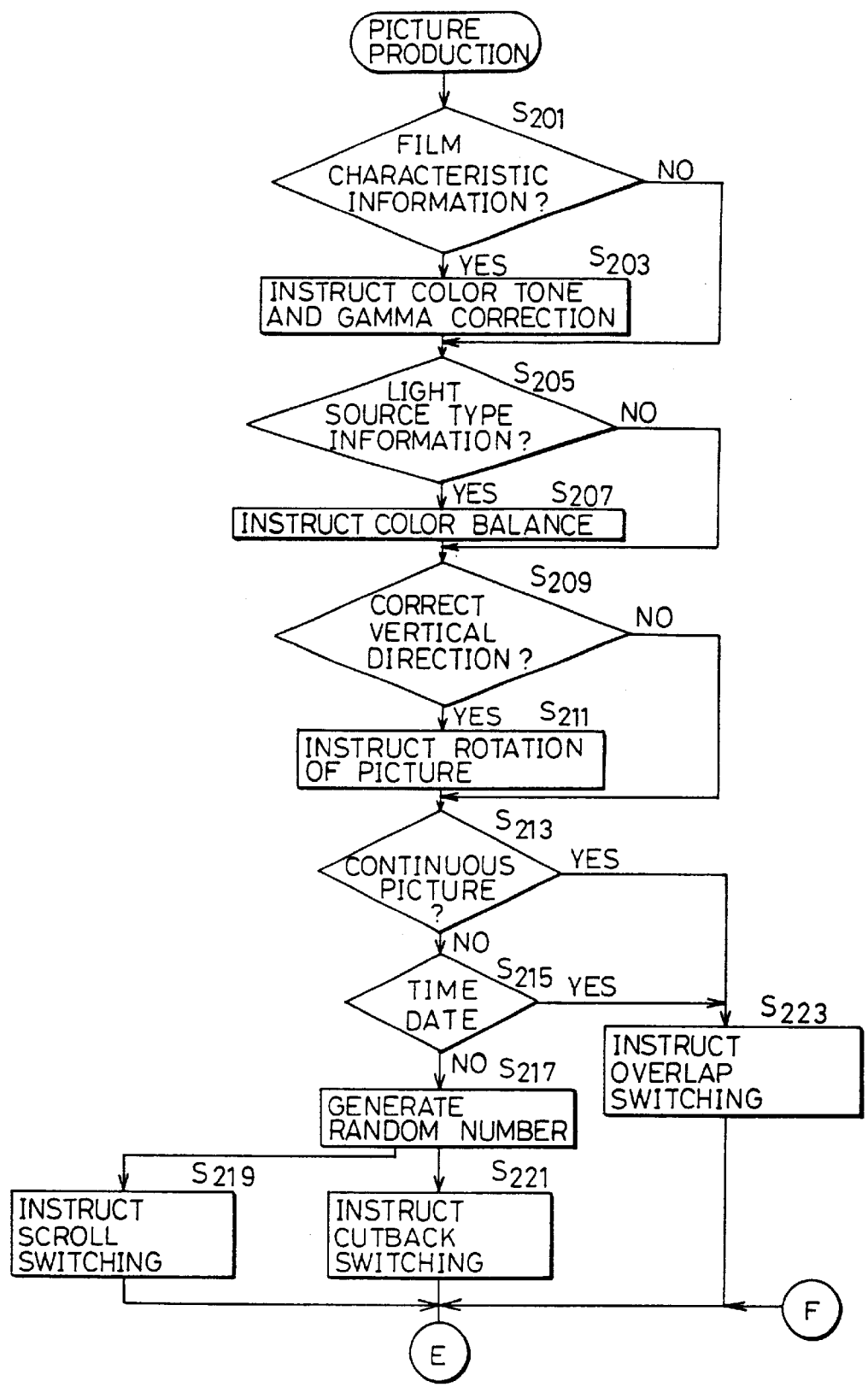

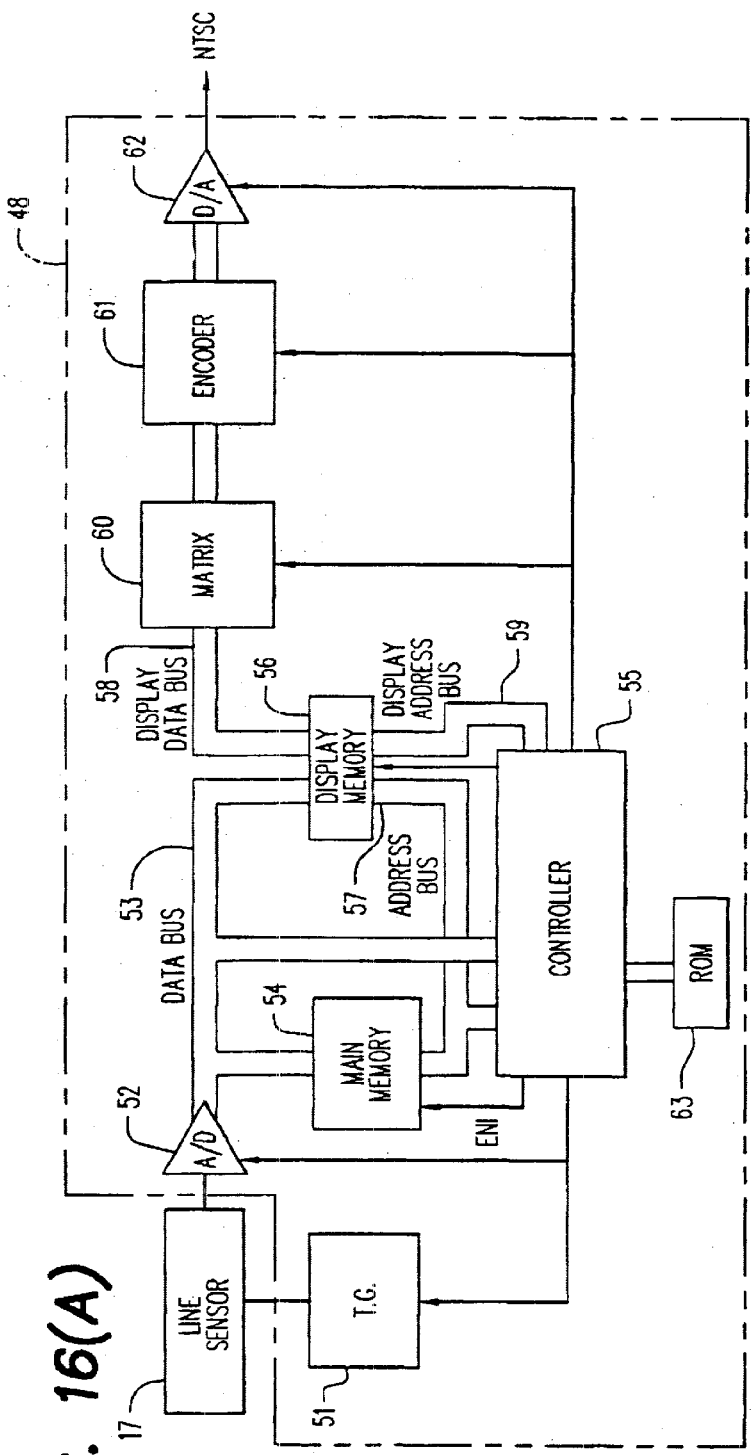
FIG. 16(A)
FIG. 16(B)

FIG. 17
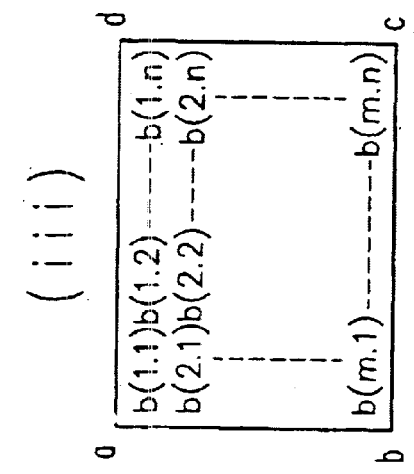
(i)
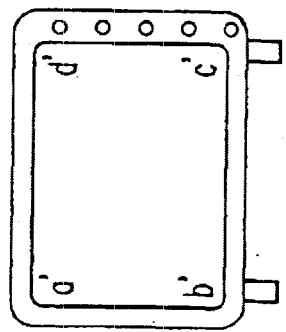
(iv)
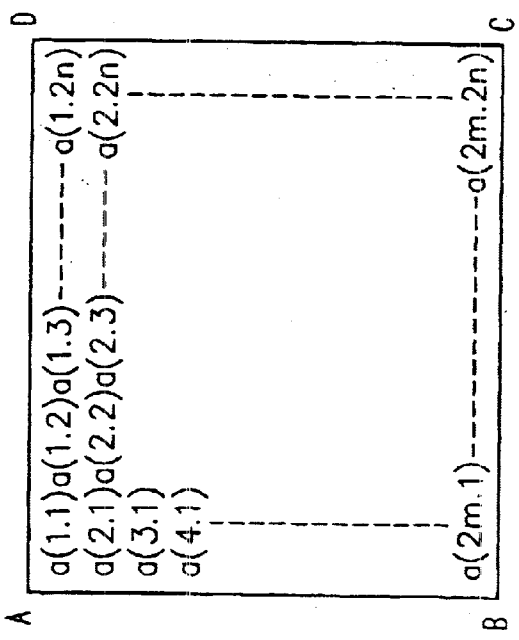
(ii)
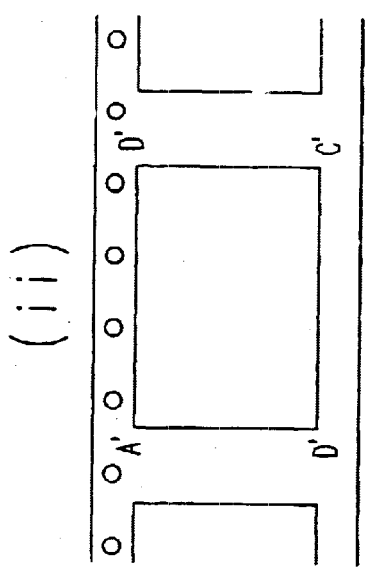
(iii)

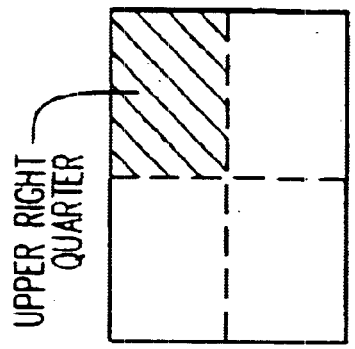
UPPER RIGHT QUARTER
MAIN MEMORY
K = n
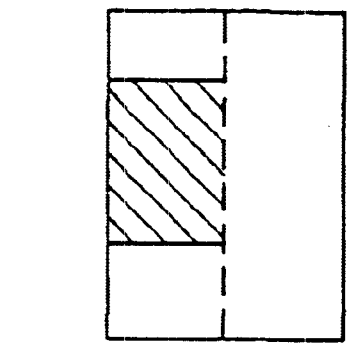
MAIN MEMORY
INCREMENT VALUE K TO RIGHTWARDLY MOVE PICTURE
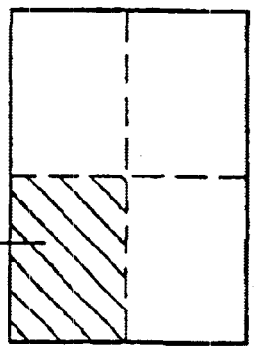
UPPER LEFT QUARTER
MAIN MEMORY
K = 0
FIG. 18

FIG. 19(A)
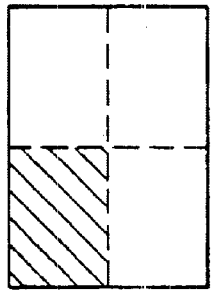
K = 0
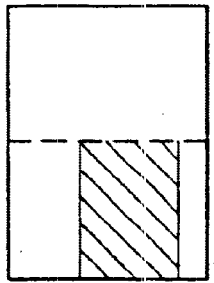
INCREMENT VALUE K TO DOWNWARDLY MOVE PICTURE
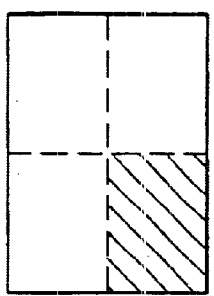
K = n
FIG. 19(B)
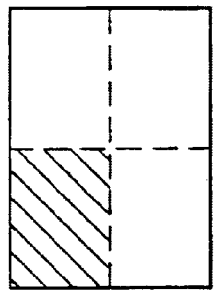
$K_1, K_2 = 0$
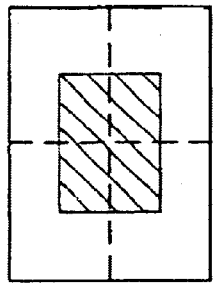
INCREMENT VALUES $K_1$ AND $K_2$ TO DOWN-RIGHTWARDLY MOVE PICTURE
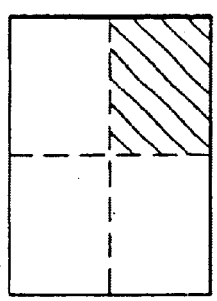
$K_1 = m$
$K_2 = n$

FIG. 20

(DISPLAY MEMORY)

| A | B | C |
|---|---|---|
| D | E | F |
| G | H | I |

STILL IMAGE REPRODUCING APPARATUS SAVING TIME FOR STILL IMAGE REPRODUCTION

This application is a divisional, of application Ser. No. 08/430,244 abandoned, filed Apr. 28. 1995, which is a continuation of application Ser. No. 07/979,783, abandoned filed on Nov. 20. 1992.

BACKGROUND OF THE INVENTION

1. Field of the Invention

The present invention relates to an apparatus, such as a film video player, for reproducing still images, and more particularly, it relates to an apparatus for taking original still images and reproducing the taken still images.

2. Description of the Background Art

There has recently been proposed an apparatus for reproducing still images, such as still images of a developed film, on a television or the like. In such an apparatus, original still images are taken by a pickup element such as an area sensor or a line sensor and converted to electric signals, which in turn are displayed on a display unit such as a television. In this case, however, a long time is required for taking the original still images. Particularly when a line sensor is employed, it is necessary to scan each frame for taking the still images with a considerably long time. Thus, the time for still image reproduction is lengthened by such a taking operation.

U.S. Pat. No. 4,482,924 discloses an apparatus for reading information corresponding to each still image and deciding a reproducing method such as zooming on the basis of the information. In such an apparatus, however, it is necessary to previously read information corresponding to each still image, and hence the reproducing time is lengthened by such an operation.

While U. S. Pat. Nos. 4,485,406, 4,603,966 and the like also disclose film video players, none of these Patents discloses a structure which can reduce the time for reproducing still images recorded in a film.

SUMMARY OF THE INVENTION

An object of the present invention is to provide a still image reproducing apparatus which can save the time for reproducing the images.

In order to attain the aforementioned object, the still image reproducing apparatus according to the present invention has a determination unit for determining whether or not still image data are currently being reproduced, and a control unit for controlling the apparatus to take another still image if the still image data are currently being reproduced. A second still image is taken during reproduction of a first still image on a screen, whereby it is possible to reproduce the second still image immediately after reproduction of the first still image is completed.

In another aspect of the present invention, the still image reproducing apparatus includes a determination unit for determining whether or not still image data are currently being reproduced, and a control unit for reading information corresponding to another still image when the still image data are currently being reproduced. Information corresponding to a second still image is read during reproduction of a first still image on a screen, whereby the second still image can be controlled on the basis of the read information immediately after reproduction of the first still image is completed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a typical diagram showing an optical system of the film player;

FIG. 12 is a flow chart showing picture production;

FIG. 16(A) is a block diagram showing a picture processing part in detail, and FIG. 16(B) is a typical diagram illustrating a line sensor 17 shown in FIG. 16(A) in detail;

FIG. 17 illustrates relations between pixel coordinates of a main memory and a film surface and between pixel coordinates of a display memory and a monitor screen;

FIG. 18 illustrates panning;

FIGS. 19(A) and 19(B) illustrate tilting and oblique movement respectively;

FIG. 20 illustrates the content of a display memory for multiscreen display;

FIG. 21 illustrates the state of screen switching by overlapping;

DESCRIPTION OF THE PREFERRED EMBODIMENTS

Embodiments of the present invention are now described with reference to the accompanying drawings.

(1) First Embodiment

Figure 1:
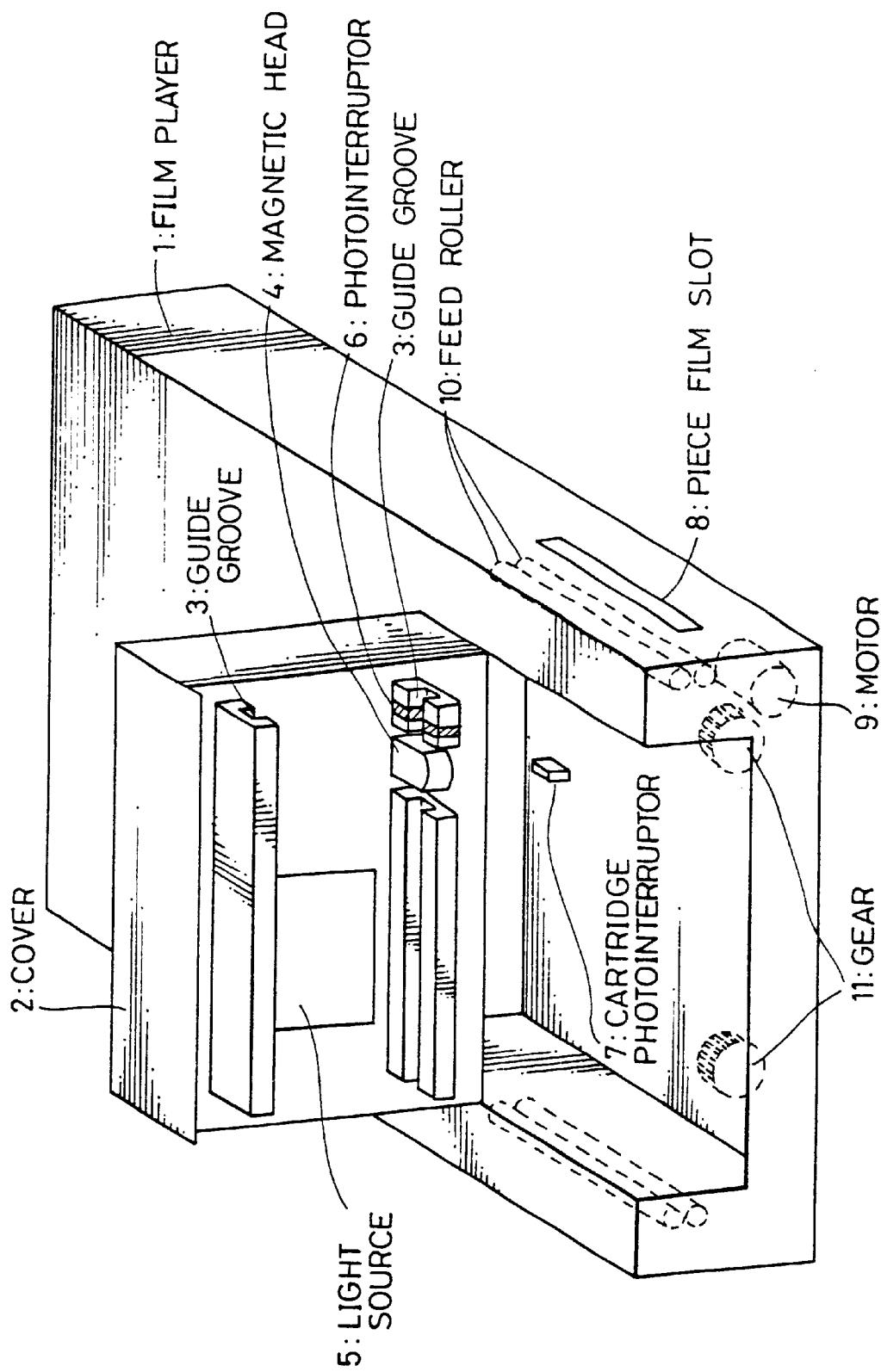
FIG. 1 is a perspective view showing the overall appearance of a film player according to a first embodiment of the present invention.

FIG. 1 is a perspective view showing a film player 1 according to a first embodiment of the present invention.

Referring to FIG. 1, the user can access the interior of the film player 1 by opening its cover 2. The film player 1 is provided on its side surface with a piece film slot 8 for receiving a piece film and feed rollers 10 for feeding the received piece film to a pickup position. The film player 1 is further provided on its central portion with gears 11 for driving a film which is stored in a cartridge and a cartridge photointerruptor 7 for positioning the film stored in the cartridge. The feed rollers 10 and the gears 11 are driven by a motor 9.

The cover 2 is provided with a pair of guide grooves 3 which is adapted to guide the piece film to the prescribed pickup position, a magnetic head 4 which is provided on one of the guide grooves 3 for reading magnetic information recorded on the film, and a light source 5 which is employed for taking a picture recorded on the film. A photointerruptor 6 for positioning the piece film is provided on an end of one of the guide grooves 3.

Figure 2:
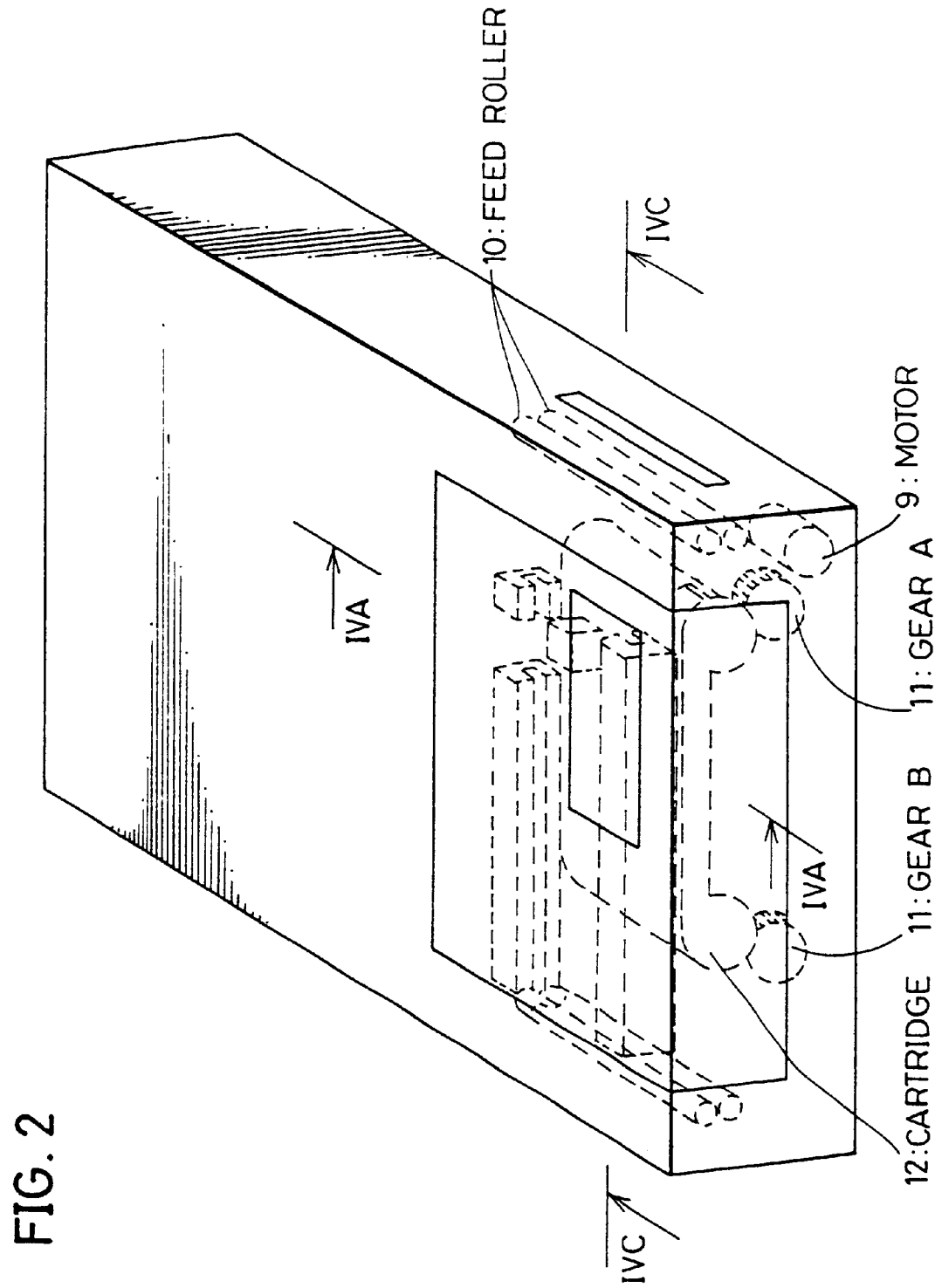
FIG. 2 is a perspective view showing the film player loaded with a cartridge.

FIG. 2 is a perspective view showing the film player 1 which is loaded with a cartridge 12. Film feed gears (not shown) provided on the cartridge 12 are adapted to engage with gears 11A and 11B of the film player 1.

In this state, the motor 9 is driven to drive the film feed gears and film take-up gears (not shown) provided on the cartridge 12 through the gears 11A and 11B of the film player 1, thereby feeding the film stored in the cartridge 12.

Figure 3:
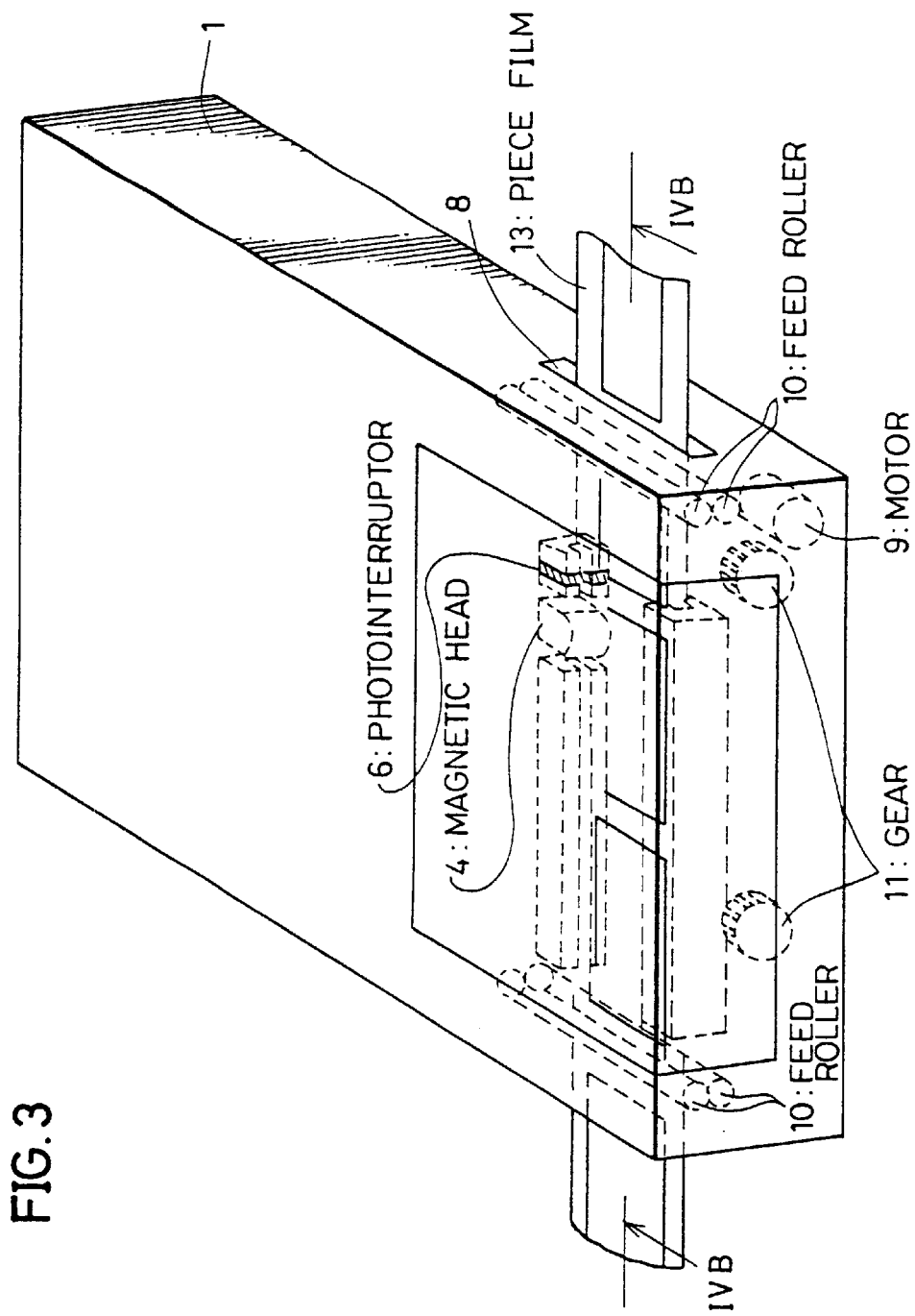
FIG. 3 is a perspective view showing the film player receiving a piece film.

FIG. 3 illustrates the film player 1 receiving a piece film 13, in correspondence to FIG. 2 showing the film player 1 loaded with the cartridge 12.

Referring to FIG. 3, the piece film 13 is inserted in the film player 1 through the piece film slot 8, and passed through the guide grooves 3 to be fed to a prescribed reproducing position by the feed rollers 10. At this time, the magnetic head 4 reads magnetic information which is recorded on the piece film 13. When the piece film 13 is correctly inserted in the film player 1, the magnetic head 4 reads information recorded by a camera in shooting. When the piece film 13 is inserted in the film player 1 along a vertically or horizontally erroneous direction, however, the magnetic head 4 erroneously reads data for developing the film in place of the information recorded by the camera, or can read absolutely no data. In this case, the feed rollers 10 are reversed to eject the film 13 or give a warning, as hereinafter described.

Figure 4A:
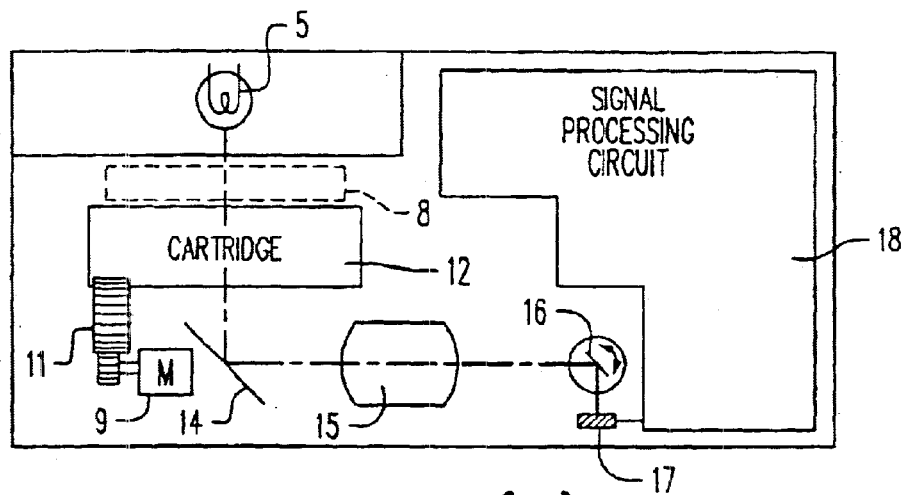
FIGS. 4(A), 4(B) and 4(C) are schematic sectional views taken along the lines IVA—IVA, IVB—IVB and IVC—IVC in FIG. 2, FIG. 3 and FIG. 2 respectively.
Figure 4B:
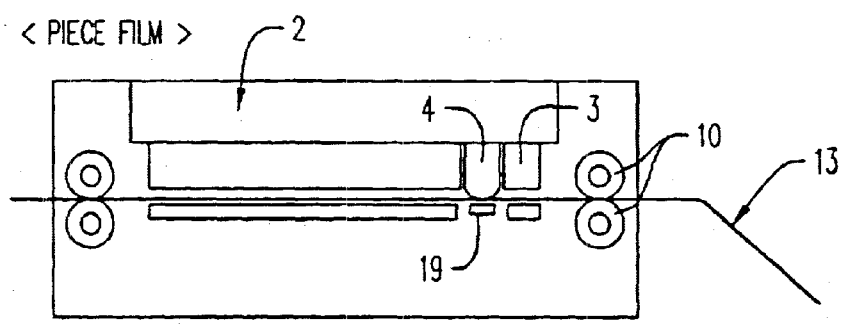
Figure 4C:
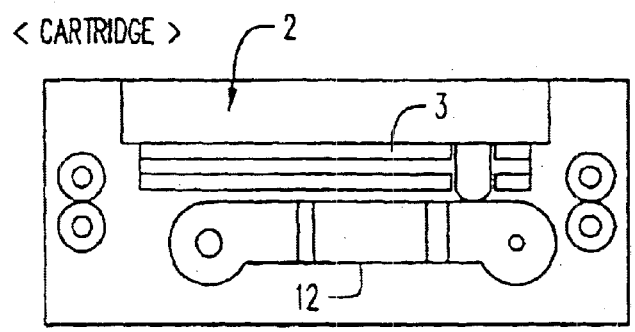

FIGS. 4(A), 4(B) and 4(C) are sectional views taken along the lines IVA—IVA, IVB—IVB and IVC—IVC in FIG. 2, FIG. 3 and FIG. 2 respectively. Referring to FIG. 4(A), an image of a picture illuminated by the light source 5 is formed on a line sensor (CCD) 17 through a mirror 14, an image forming lens 15 and a scan mirror 16. A signal outputted from the CCD 17 is processed by a signal processing circuit 18.

FIG. 4(B) illustrates a path for carrying the piece film 13 for taking a picture provided thereon, and FIG. 4(C) illustrates a state of taking a picture provided on the film stored in the cartridge 12. Referring to FIGS. 4(B) and 4(C), the guide grooves 3 for carrying the piece film 13 are urged by springs toward the interior of the cover 2, and partially retracted in the cover 2 when the film player 1 is loaded with the cartridge 12, so that the pictures provided on the piece film 13 and the film stored in the cartridge 12 are taken on the same position.

FIG. 5 illustrates the part, shown in FIG. 4(A), for reading the picture provided on either film by the CCD 17 in detail. Referring to FIG. 5, the scan mirror 16 is rotatable along arrow so that a part A of a film 20 is image-formed on the CCD 17 when the scan mirror 16 is in a state shown by a broken line. When the scan mirror 16 is rotated to a state shown by a solid line, another part B of the film 20 is image-formed on the CCD 17. Thus, the parts A to C of the film 20 are successively image-formed on the CCD 17, to be photoelectrically converted. A photometric sensor 21 detects part of light which is incident upon the CCD 17, to adjust an aperture 22 in response to the quantity of the light received therein. A converter lens 23 is inserted in the optical path for zooming.

The scan mirror 16 is now described in detail with reference to the right part of FIG. 5 showing the scan mirror 16 in an enlarged manner. The scan mirror 17 includes a worm gear 28 which is driven by a motor 27, a bevel gear 25 which is connected with a wheel gear 29 engaging with the worm gear 28, another bevel gear 27 engaging with the bevel gear 25 and having another worm gear 30, and a mirror 32 which is fixed to another wheel gear 31 engaging with the worm gear 30.

The bevel gears 25 and 26 are provided with notches respectively. The bevel gear 26 is urged by a spring in one direction.

The mirror 32 is maintained in an initial position by engagement of the notches provided in the bevel gears 25 and 26. When the motor 27 is rotated, the bevel gear 25 is rotated through the worm gear 28 and the wheel gear 29. Thus, the other bevel gear 26 is rotated to rotate the worm gear 30 and the wheel gear 31, thereby rotating the mirror 32. When the notches of the bevel gears 25 and 26 again engage with each other, the rotation is stopped and the mirror 32 is brought back to the initial position by a spring. Such an operation is so repeated that the CCD 17 scans the overall region of the film 20 crossing the feed direction.

Figure 6:
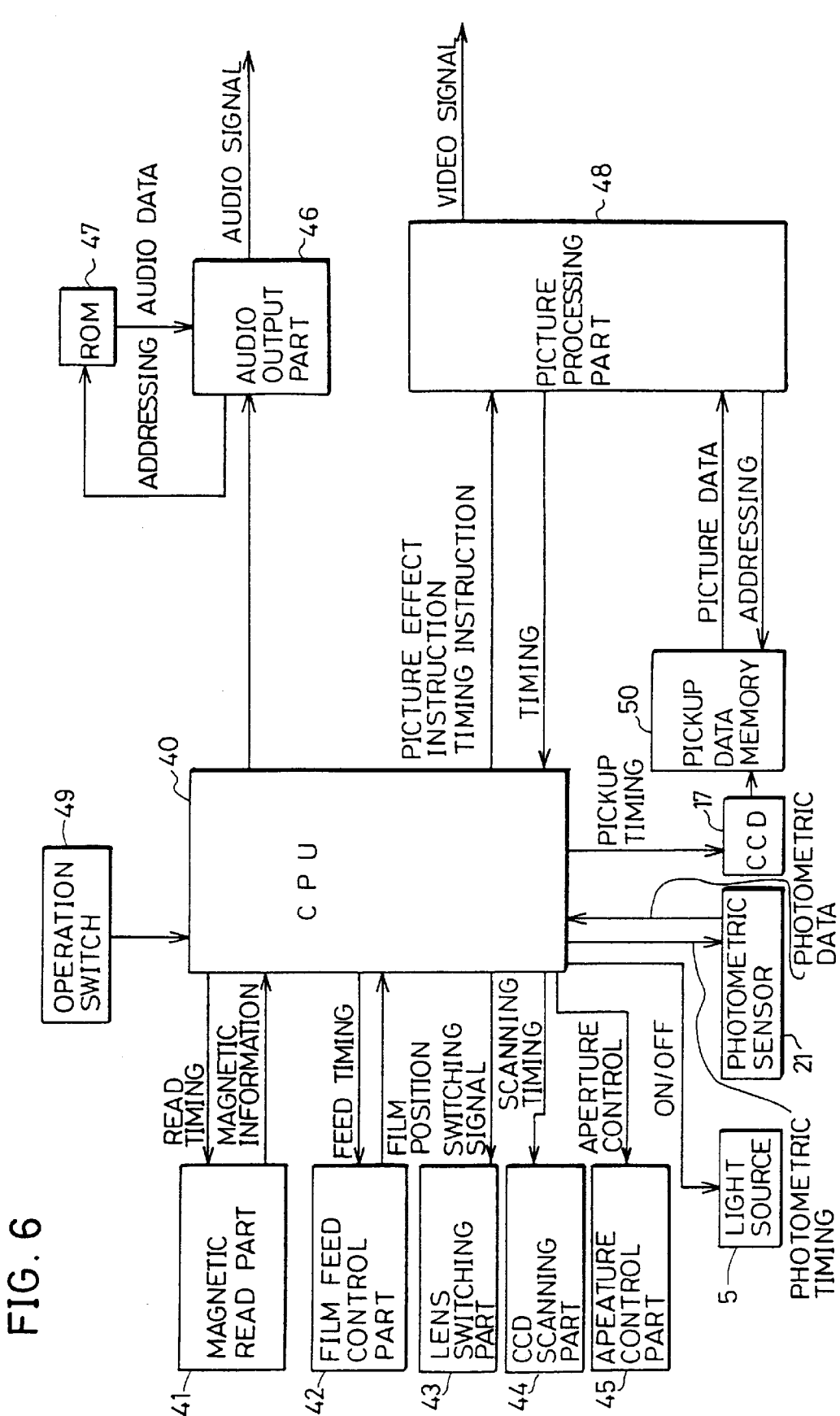
FIG. 6 is a block diagram showing a principal portion of a control part in the film player.
Figure 7:
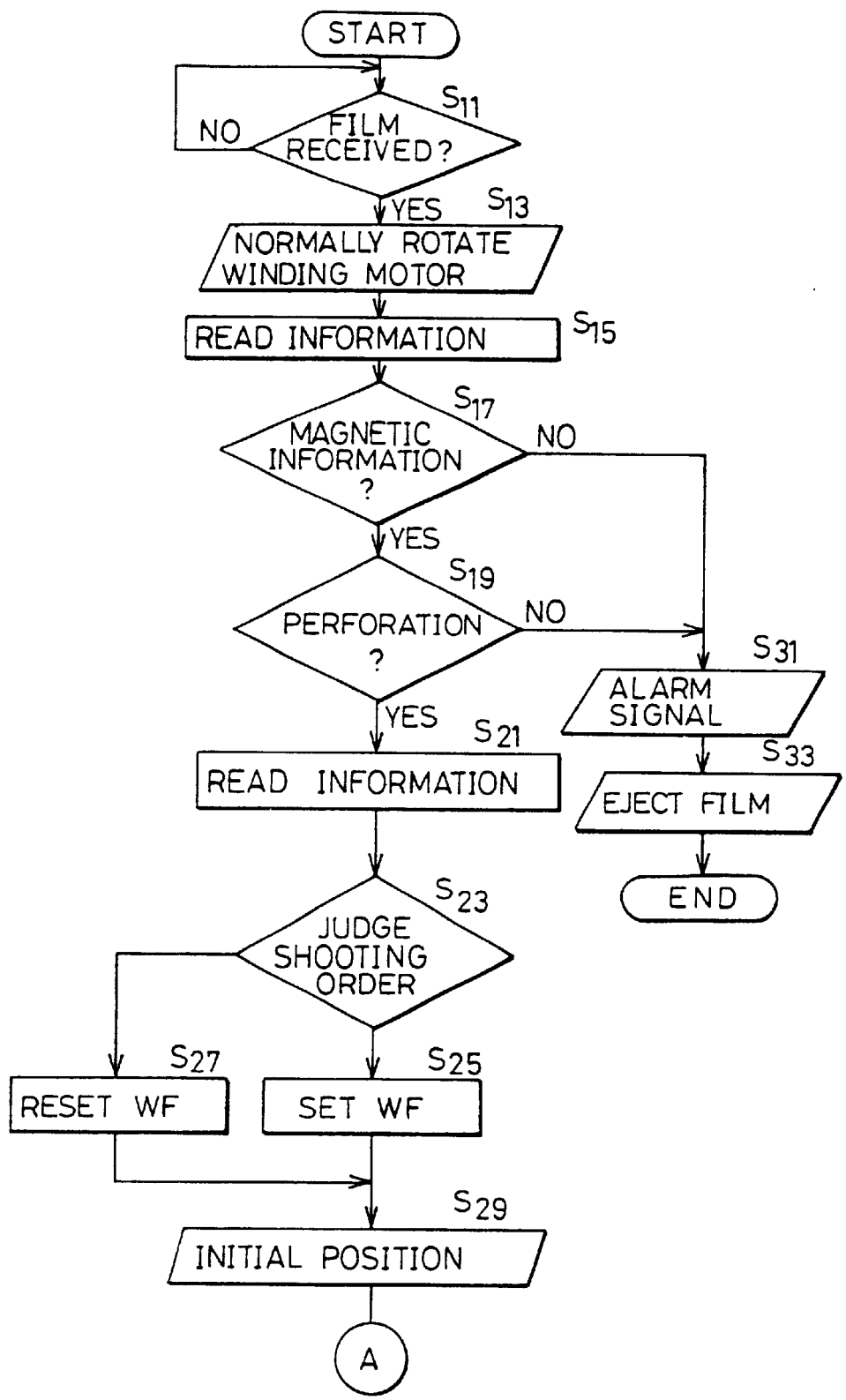
FIG. 7 is a flow chart showing the operation of the film player.

FIG. 6 is a block diagram showing a principal portion of a control part in the film player 1 according to the first embodiment of the present invention.

Referring to FIG. 6, a CPU 40 for controlling the overall film player 1 is connected with a magnetic read part 41 which reads magnetic information from a film in response to a read timing signal which is received from the CPU 40 for outputting the data to the CPU 40 as digital information. The magnetic read part 41, which has a magnetic head for reading the magnetic information from the film, an amplifier for amplifying the same and a recording function, transmits information as to presence/absence of magnetic information on the film.

The CPU 40 is further connected with a film feed control part 42, which comprises-frame feeding, rewinding and positioning functions for the film. The film feed control part 42 detects presence/absence of perforations in the film, and gives an alarm signal to the CPU 40 if the film has no perforations.

A lens switching part 43 switches the magnification of a pickup lens in response to a switching signal received from the CPU 40.

A CCD scanning part 44 controls pickup scanning by the CCD 17 in response to a scanning timing signal received from the CPU 40.

An aperture control part 45 controls the aperture (22 shown in FIG. 5) for pickup exposure control in response to an aperture control signal received from the CPU 40. As hereinabove described with reference to FIG. 5, the CPU 40 utilizes photometric data received from the photometric sensor 21 in order to obtain the aperture control signal. In other words, the CPU 40 calculates the aperture value to attain proper exposure in taking, and feeds back the same to the aperture control part 45.

The CPU 40 controls on-off of the pickup light source 5, and supplies a pickup timing signal to the CCD 17. A picture signal taken by the CCD 17 is stored in a pickup data memory 50.

The CPU 40 is further connected with a picture processing part 48 which processes the picture data stored in the pickup data memory 50 and outputs the same to a television set as a video signal.

The CPU 40 is further connected with an audio output part 46, which D-A converts audio data received from a ROM 47 and outputs the converted data to the television set as an audio signal. The ROM 47, which is a memory storing audio data, outputs corresponding data to the audio output part 46 in response to an addressing signal received from the CPU 40.

The CPU 40 is further connected with a manual operation switch 49. It is possible to transversely rotate, zoom, horizontally pan, vertically tilt, or hold a picture provided on the film, or to automatically start the film player 1 itself by controlling the operation switch 49.

The operation of the film player 1 according to the first embodiment of the present invention is now described with reference to flow charts shown in FIGS. 7 to 10. First, the film player 1 is started, to wait loading (or insertion) of a film (or a piece film) (step S11: hereinafter the term "step" is omitted). If the film player 1 is loaded with a film at S11, a winding motor is normally rotated to normally rotate the feed rollers 10 for the piece film 13 or the film feed gears 11 for the film provided in the cartridge 1-2. The magnetic head 4 reads magnetic information recorded on the received film, for checking presence/absence of such magnetic information (S15 and S17). If the received film is provided with magnetic information, presence/absence of perforations is judged (S19). If the film has perforations, the magnetic information is read (S21). If a determination is made at S17 that the film has no magnetic surface, a warning is given since the film is provided with no magnetic information or has been loaded or inserted reversely (S31). If a determination is made at S19 that the film has no perforations, a warning is given to eject the film, since the film has been loaded or inserted upside down (S31 and S33).

It is assumed here that the magnetic information showing shooting situation is recorded on the film to be reproduced in the film player 1 and perforations for positioning are provided only on the upper or lower side of the film.

Figure 9:
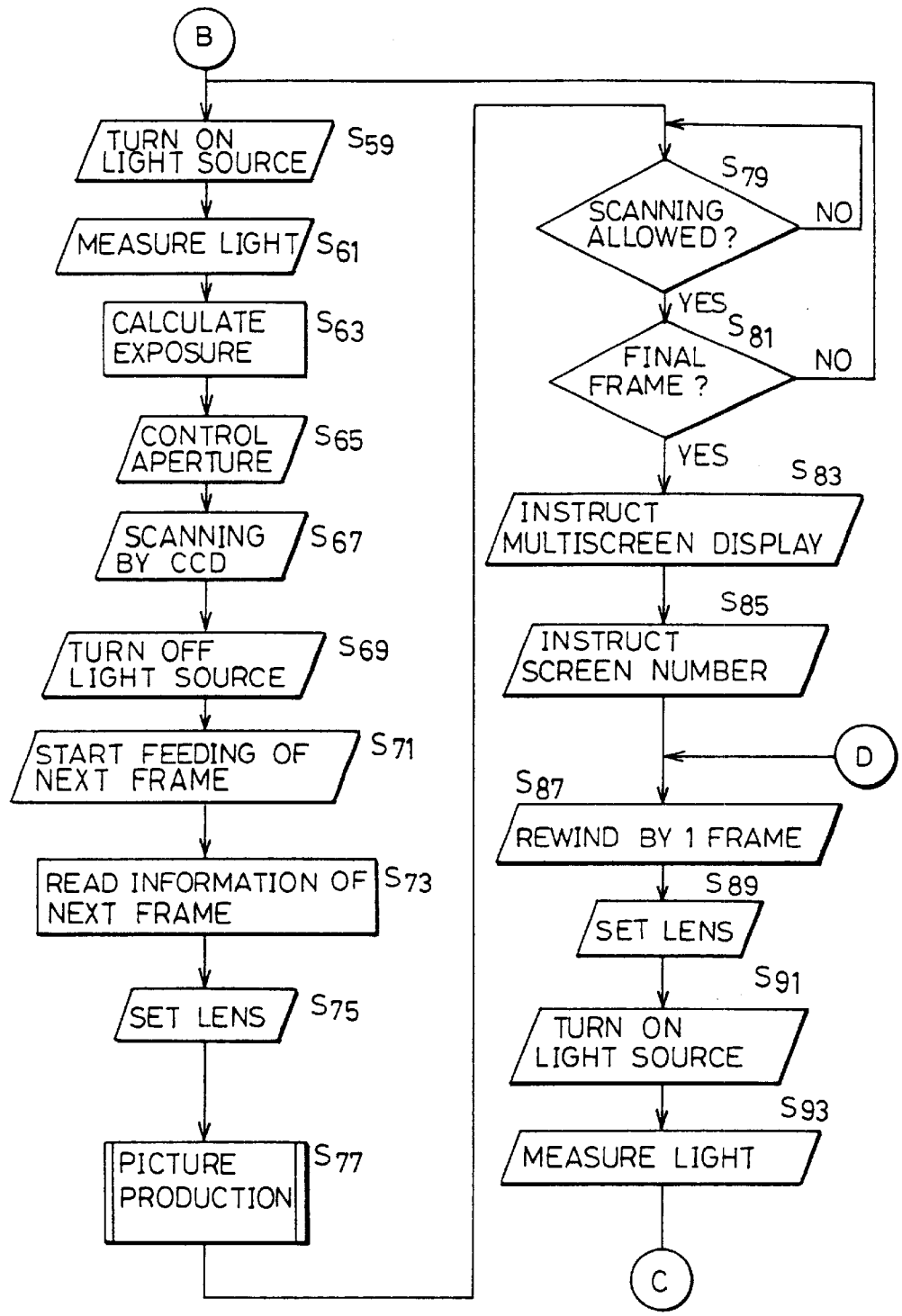
FIG. 9 is a flow chart showing the operation of the film player.
Figure 10:
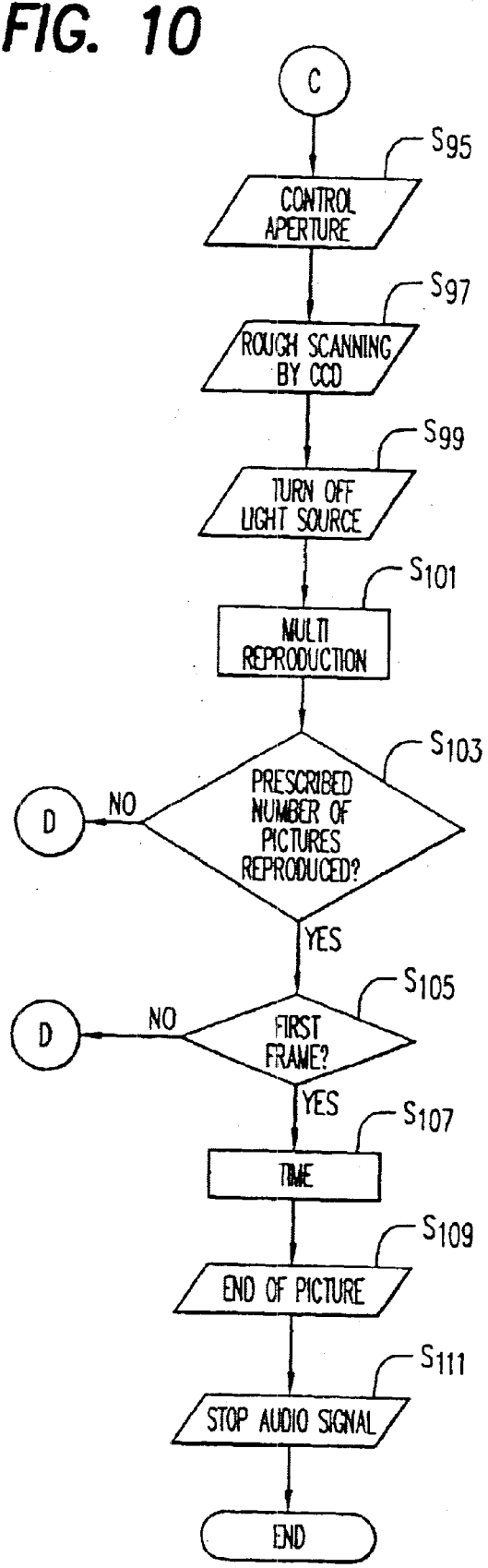
FIG. 10 is a flow chart showing the operation of the film player.

In order to eject this film, the motor 9 shown in FIG. 9 is reversed.

Then, shooting time information which is magnetically recorded on continuous frames provided on the film is read to judge the order of pictures (S23). In response to the result of this judgement, a determination is made as to whether the film is a normal wind film which may be wound frame by frame or a pre-wind film which has been fully wound once and then rewound frame by frame. Thus, a winding flag WF is set or reset (S25 or S27). Then, an initial position of the film is decided (S29). In more concrete terms, the head portion of the frames is placed on the pickup surface. Then the audio signal is reproduced to instruct initial picture display (S35 and S37). In the initial picture display, a demo picture or characters such as "Minolta" may be displayed, for example.

Figure 11A:
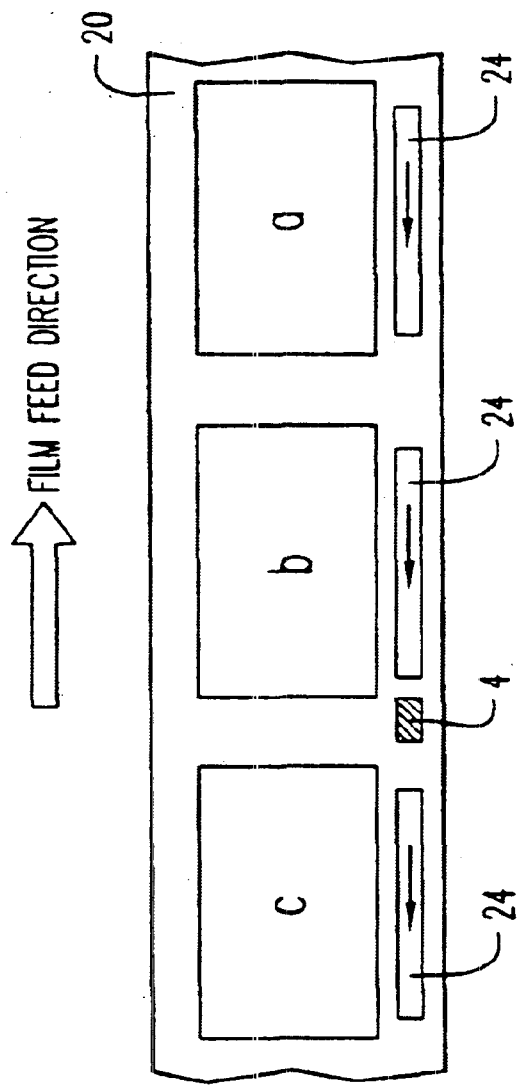
FIGS. 11(A) and 11(B) illustrate read states of a magnetic information part on a film.
Figure 11B:
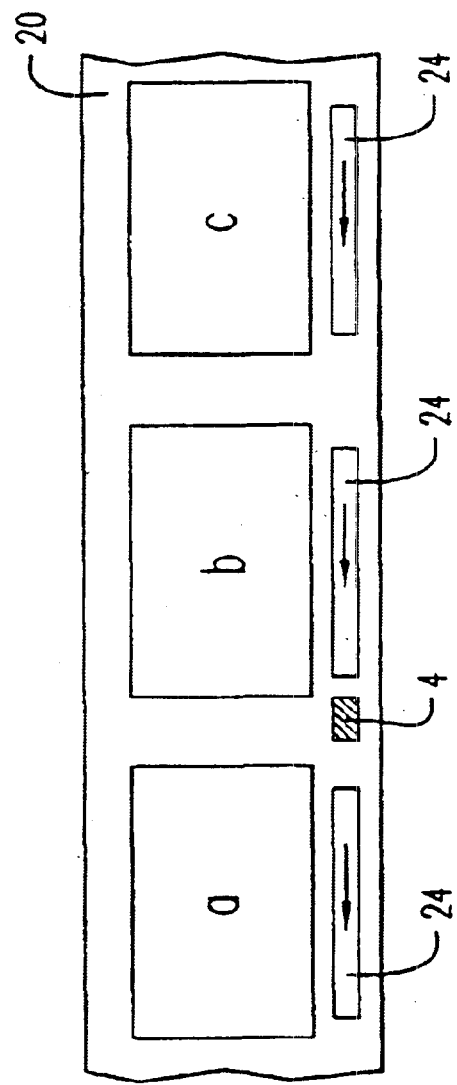

Then the picture signal is started (S39) and the winding flag WF is judged to determine whether the film is normally rotated or back-fed by two frames in response to the state of the film (S41 and S43 or S47). The reason for such a determination is now described with reference to FIGS. 11(A) and 11(B). FIGS. 11(A) and 11(B) show normal wind and pre-wind films 20 respectively. In either case, it is assumed that frames a, b and c have been subjected to shooting in this order, and picture processing of the frame b is just finished. It is also assumed that magnetic information 24 is successively recorded along arrows.

In order to move the frame c of the normal wind film 20 to a pickup region b for scanning, the film 20 may be directly fed along arrow shown in FIG. 11(A) so that the magnetic head 4 can read the magnetic information 24. In the pre-wind film 20 shown in FIG. 11(B), on the other hand, the frame c to be subsequently read must be first moved to the position of the frame a, so that the magnetic head 4 can read the magnetic information 24.

The frames are thus positioned and the film feed motor 9 is stopped (S49 and S51). Then, a determination is made as to whether or not electrozooming (EZ) is required (S53). This information is included in the magnetic information 24. If a determination is made at S53 that electrozooming is required, a telephoto lens is selected by the converter lens 23 for taking, while a wide angle lens is selected for taking in other case (S55 or S57).

In order to perform trim taking, the magnification is doubled by electrozooming and the telephoto lens is selected by the converter lens 23 shown in FIG. 5, whereby the magnification is quadrupled in total.

Then the light source 5 is turned on to measure light on the film surface with the photometric sensor 21 thereby controlling the aperture 22 for scanning by the CCD 17, and then the light source 5 is turned off (S59 to S69).

After the scanning, the next frame is previously moved to the pickup region (b in FIG. 11(A)) and information is read from the next frame (S71 and S73). A determination is previously made as to whether or not the converter lens 23 is required from EZ information of the next frame, and picture production is performed in this state (S75 and S77). The content of the picture production is described later.

Then, a determination is made as to whether or not the next frame can be scanned (S79), in order to judge whether or not production such as zooming or panning of the preceding frame is completed and picture data of the preceding frame recorded in a main memory 54 as described later are not further processed. When the picture data are completely processed, those stored in a display memory 56 as described later are reproduced on a TV screen, whereby it is possible to newly record picture data of the next frame in the main memory 54.

When a determination is made that scanning is possible, another determination is made as to whether or not the frame under reproduction is the final one from information included in the magnetic information 24 (S81). If a determination is made that scanning is possible and the frame is not the final one, the process is returned to S59 to start scanning of the next frame. Thereafter the aforementioned routine is repeated.

If a determination is made at S81 that the frame is the final one, on the other hand, multiscreen display is performed to display all frames heretofore taken on a single screen (S83). In this case, an instruction is made for dividing the screen into four, nine or 25 screens (S85). This instruction is made through the manual operation switch 49 or the like, for example.

In order to perform multiscreen display, all frames heretofore taken are rewound one by one in order which is reverse to that in reproduction, so that respective pictures and magnetic data are inputted in the CPU 40.

Namely, the film 20 is rewound frame by frame, a lens is set, the light source 5 is turned on, the light is measured by the photometric sensor 21, and the aperture 22 is controlled (S87 to S95). Then rough scanning is performed by the CCD 17. In order to perform multiscreen display, the pictures are partially skipped for reducing the scanning time (S97). If four pictures are simultaneously displayed, for example, the picture data may be reduced to ¼, while the picture data may be reduced to ⅑ if nine pictures are simultaneously displayed.

Then the light source 5 is turned on for multi-reproduction (S99 and S101). A determination is made as to whether or not a prescribed number of four, nine or 25 pictures are reproduced (S103), and if the determination is of yes, another determination is made as to whether or not the film is rewound to the first frame (S105), to repeat multi-reproduction until the film is rewound to the first frame (S105). If the determination at S103 is of no, on the other hand, the program is returned to S87.

While the multi-reproduction (S101) is performed in advance of the determination as to the screen number (S103), this step may be carried out after S103. When the multi-reproduction is performed before the determination as to the screen number, prescribed pictures are successively outputted on prescribed positions, while overall pictures are simultaneously displayed on the multiscreen if this step is carried out after the determination as to the screen number.

Although the final frame is judged in the aforementioned embodiment for multiscreen display, only frames of the same date may be subjected to multiscreen display at the end of the day, for example.

When the multiscreen display is performed at the last step, it is possible to perform multi-reproduction while rewinding the film.

When the film is rewound to the first frame, the multi-screen is displayed for a constant period, whereafter the reproduction is terminated and the audio signal is stopped (S107 to S111).

Figure 13:
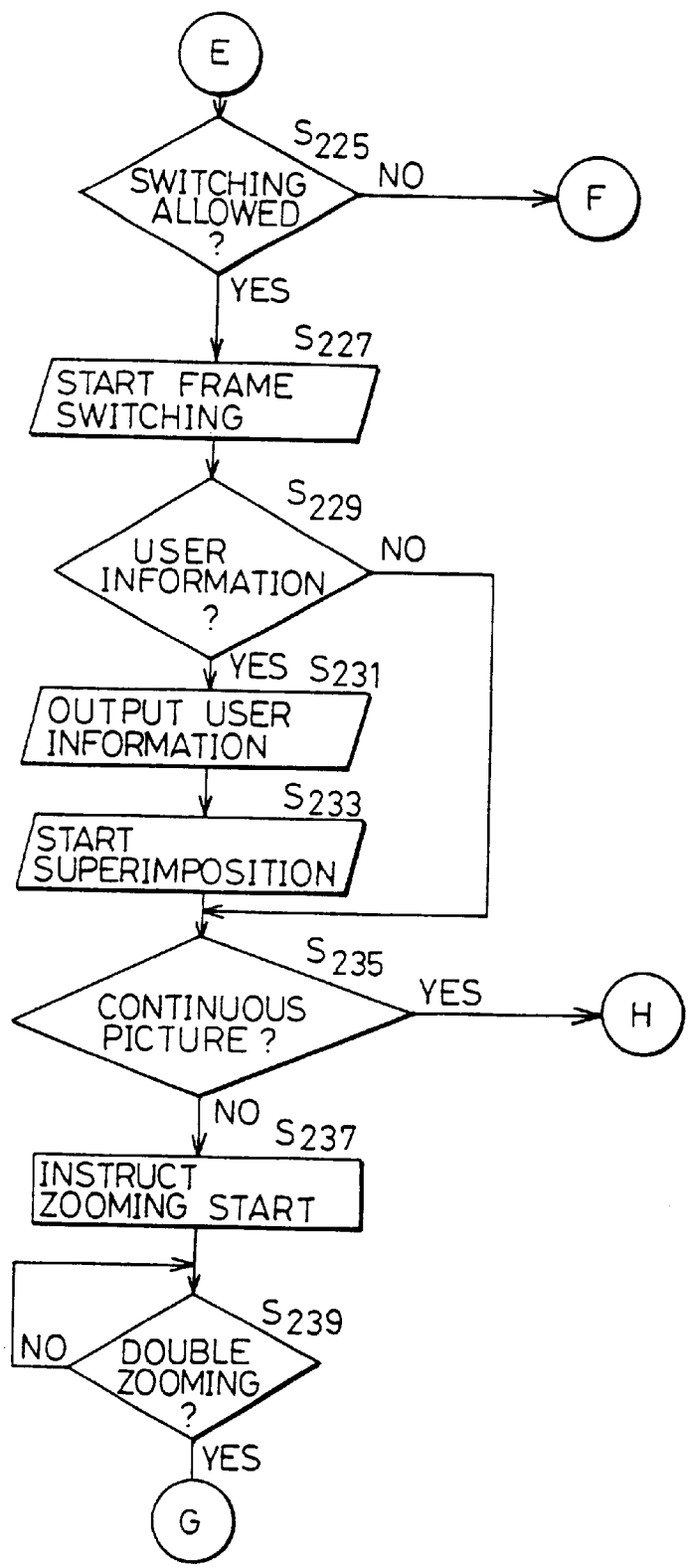
FIG. 13 is a flow chart showing picture production.
Figure 14:
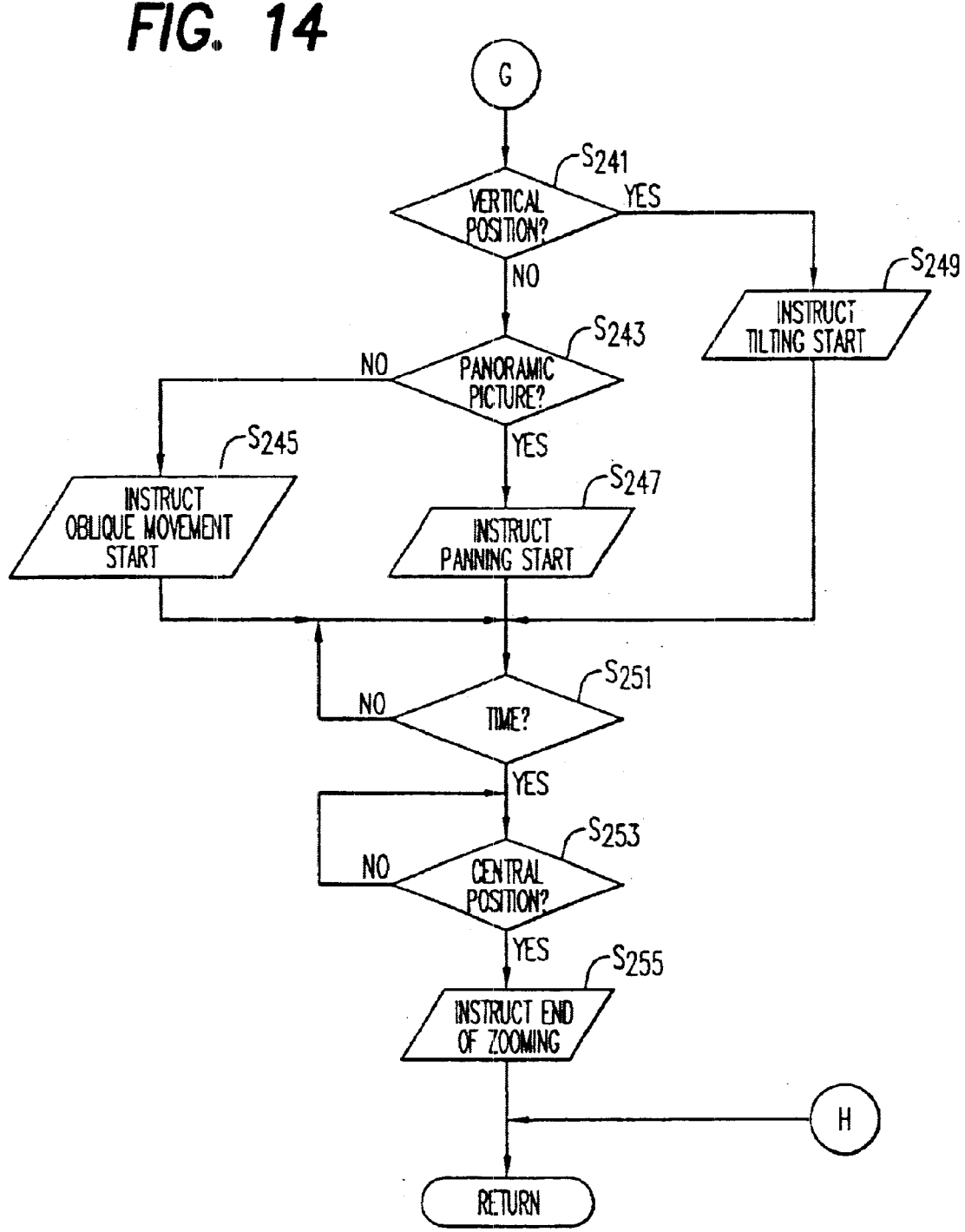
FIG. 14 is a flow chart showing picture production.

The picture production mentioned above in relation to S77 in FIG. 9 is now described. FIGS. 12 to 14 are flow charts showing the content of picture production.

First, a determination is made as to whether or not the magnetic information 24 includes data such as the base color of the film 20, color development, gamma correction, density and colors employed in printing in a laboratory, and the like (S201). If the determination is of yes, color tones and gamma correction are instructed (S203). If the determination at S201 is of no, on the other hand, another determination is made as to presence/absence of light source type information (S205), to judge data as to whether the light source employed for shooting is a fluorescent lamp or a tungsten lamp, whether or not a flash lamp is employed, and the like. Color balance is instructed in response to presence/absence of the data, and the vertical direction of the film 20 is judged (S209). The vertical direction is judged also when no light source type information is obtained at S205. If the film is judged to be vertically inverted, rotation of pictures is instructed (S211), and a determination is made as to whether or not the pictures are continuous (S213). If the determination at S213 is of no, another determination is made as to information on time and date (S215). If no information is obtained at S215, a random number is generated to twitch the method of displaying the pictures on the screen to scroll switching or cutback switching (S217, S219 and S221). "Scroll switching" is a method of successively switching the pictures from the left end of the screen, for example, while "cutback switching" is a method of instantaneously switching the pictures.

If the determination at S213 is of yes and the time and date are recognized at S215, overlap switching is performed for wiping off a reproduced picture while reproducing a next picture (S223).

In any switching method, a determination is made as to whether or not the pictures can be switched in relation to timing with the picture previously displayed (S225), and the frames are switched if the determination is of yes (S227). If the determination at S225 is of no due to zooming or the like, on the other hand, allowance of switching is waited.

Then, a determination is made as to presence/absence of user information, so that the user information is outputted and superimposed if the determination is of yes (S231 and S233). The "user information" is that inputted by the user during or after shooting, such as the title of the frame, for example.

Then, a determination is made as to whether or not the pictures are continuous, regardless of presence/absence of the user information (S235), so that no zooming for smoothing the scene change is performed if the determination is of yes. If the determination at S235 is of no, a zooming start instruction is made for double zooming, and a determination is made as to whether or not the pictures are in vertical positions (S237, S239 and S241). If the determination at S241 is of no, another determination is made as to whether or not the pictures are panoramic (S243). If the determination at S243 is of yes, a panning start is instructed (S247), while an oblique movement start is instructed if the determination is of no (S245). If the determination at S241 is of yes, on the other hand, a tilting start is instructed (S249).

Figure 15C:
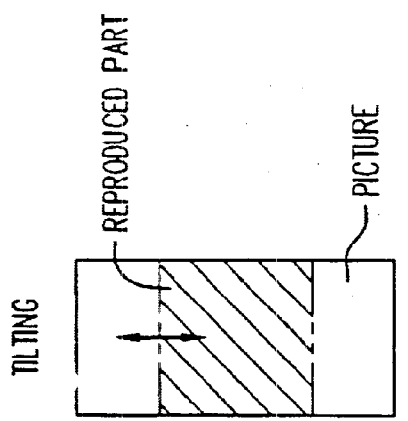
FIGS. 15(A), 15(B) and 15(C) illustrate contents of picture processing operations in response to respective frames of a film.
Figure 15B:
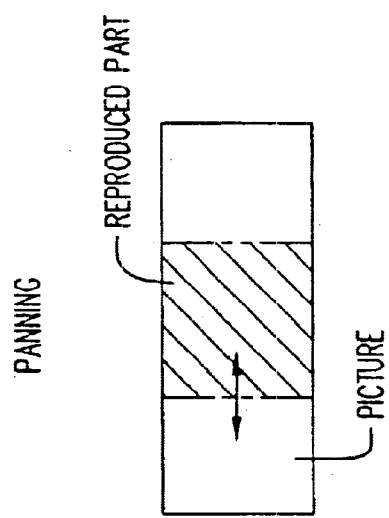
Figure 15A:
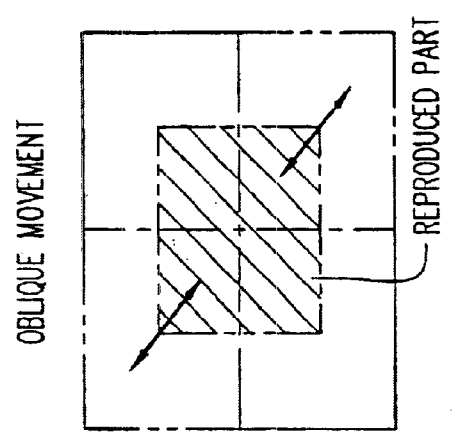

The tilting start, panning start and the like are now described with reference to FIGS. 15(A) to 15(C). FIG. 15(A) illustrates oblique movement, FIG. 15(B) illustrates panning, and FIG. 15(C) illustrates tilting.

When a picture is neither in a vertical position nor a panoramic one, this picture is taken downwardly obliquely from the above or vice versa as shown in FIG. 15(A). On the other hand, a panoramic picture is transversely panned and taken as shown in FIG. 15(B). In the case of tilting, a picture is vertically taken as shown in FIG. 15(C). In every case, the picture is reproduced by the picture processing circuit 48 not in only one direction but automatically reversed on a unidirectional end to another end.

When the pictures are reproduced in the aforementioned manner for a constant period (S251), a determination is made as to whether or not the oblique movement, panning or tilting is completed at a central portion of the picture from which taking is started and the film is returned to the first position again (S253). If the determination at S253 is of yes, zooming is terminated (S255).

The picture production is now described in detail. FIG. 16(A) is a block diagram illustrating the picture processing circuit 48 shown in FIG. 6 in detail, and FIG. 16(B) is a typical diagram illustrating the line sensor 17 shown in FIG. 16(A) in detail.

Referring to FIG. 16(A), the line sensor 17 is connected to a timing generator (TG) 51 provided in the picture processing circuit 48, so that its picture signal is transmitted to an A-D converter 52 pixel by pixel by timing from the TG 51. A picture to be incorporated is successively scanned by the scan mirror 16 from top to bottom, so that a single picture is converted to an electric signal by the line sensor 17.

As shown in FIG. 16(B), the line sensor 17 is repeatedly provided with color filters of green, red and blue in a zigzag manner successively from an end thereof. Thus, the line sensor 17 apparently has quadruple resolution.

Referring again to FIG. 16(A), A-D converted picture data are carried on a data bus 53, and stored in the main memory 54. A controller 55 records the picture data in the main memory 54 by an enable signal EN1.

The display memory 56 is in one-to-one correspondence to the screen of a television monitor as described later, so that a picture placed on the display memory 56 is directly projected on the television monitor. When a part of the main memory 54 having larger capacity than the display memory 56 is transferred to the display memory 56, therefore, this part is projected on the television monitor.

The display memory 56 has a dual port, so that data are transferred from the main memory 54 to the display memory 56 by the data bus 53 and an address bus 57, while the controller 55 makes memory access to the display memory 56. On the other hand, the content of the display memory 56 is transmitted to a matrix circuit 60 every 1/60 seconds through a display data bus 58 and a display address bus 59.

The picture data transmitted to the matrix circuit 60 are converted from red, green and blue to color difference signals Y, R-Y and B-Y, further converted to NTSC signals by an encoder 61, and outputted on the screen of the television monitor by a D-A converter 62 as analog NTSC signals.

The controller 55 is connected with a ROM 63, which is adapted to store data for placing characters or a blue back on the display memory 56.

FIG. 17 shows relations between data addresses (i) of the main memory 54 and a picture position (ii) on the film and between data addresses (iii) of the display memory 56 and a picture position (iv) on the television monitor.

Referring to (i) and (ii) in FIG. 17, a picture provided in a frame of the film enclosed by symbols A', B', C' and D' is converted to a picture signal by the line sensor 17, to be stored in correspondence to a portion of the main memory 54 enclosed by symbols A, B, C and D. The main memory 54 is formed by 2n by 2m pixels, each having 6-bit gradation.

Referring to (iii) and (iv) in FIG. 17, the display memory 56 is formed by n by m pixels each having 6-bit gradation, so that a position of the display memory 56 enclosed by symbols a, b, c and d corresponds to a position of the television monitor enclosed by symbols a', b', c' and d' for picture display.

Parts of data (a(1, 1) to a(2m, 2n)) of the main memory 54 are placed in the display memory 56 (b(1, 1) to b(m, n)) for the operation such as panning, tilting or zooming, as hereafter described.

(i) When all contents of the main memory 54 are displayed:

$$a(2i, 2j)=b(i, j) \ (i=1 \text{ to } m, j=1 \text{ to } n)$$

The data are transferred from the main memory 54 to the display memory 56 along the above expression. Namely, it is possible to project all pictures contained in the main memory 54, by skipping every other data of the main memory 54 and transferring the same to the display memory 56.

(ii) Panning

First, a picture on an upper left quarter of the main memory 54 is displayed along the following expression:

$$a(i, j)=b(i, j) \ (i=1 \text{ to } m, j=1 \text{ to } n)$$

Then, the following expression is employed and the value k is successively incremented from 1:

$$a(i, j+k)=b(i, j) \ (i=1 \text{ to } m, j=1 \text{ to } n)$$

When the value k reaches the value n, the picture is moved to an upper right quarter of the main memory 54, as shown in FIG. 18.

(iii) Tilting

Similarly to the case of panning, a picture on the upper left quarter of the main memory 54 is downwardly tilted along the following expression:

$$a(i+k, j)=b(i, j) \ (i=1 \text{ to } m, j=1 \text{ to } n)$$

The value k is successively incremented from 1 to m. FIG. 19(A) illustrates this state.

(iv) Zooming

In the aforementioned state (i) of displaying all contents of the main memory 54, a zoom-up operation is performed along the following expression:

$$a(m+pk, n+pL)=b(m/2+k, n/2+L) \ (k=\pm 1 \text{ to } \pm m/2, L=\pm 1 \text{ to } \pm n/2)$$

The zoom magnification p is changed tenth by tenth from 2 to 1, and approximated to the closest integer if the value pk or pL is a decimal number.

(v) Oblique Movement

Referring to FIG. 19(B), oblique movement of a picture is now described. Similarly to the cases of panning and tilting, a picture on the upper left quarter of the main memory 54 is obliquely moved to a lower right position along the following expression:

$$a(i+k_1, j+k_2)=b(i, j) \ (i=1 \text{ to } m, j=1 \text{ to } n)$$

The value $k_1$ is successively incremented from zero to m, while the value $k_2$ is successively incremented from zero to n.

Similarly, a picture on the upper right quarter is moved to a lower left position along the following expression:

$$a(j+k_1, j-k_2)\ b(i, j)\ (i=1\ to\ m,\ j=n\ to\ 2n)$$

Similarly, a picture on a lower left quarter is moved to an upper right position along the following expression:

$$a(i-k_1, j+k_2)=b(i, j)\ (i=m\ to\ 2m,\ j=1\ to\ n)$$

Similarly, a picture on a lower right quarter is moved to an upper left position along the following expression:

$$a(i-k_1, j-k_2)=b(i, j)\ (i=m\ to\ 2m,\ j=n\ to\ 2n)$$

In every case, the values $k_1$ and $k_2$ are incremented from zero to m and n respectively.

(vi) Multiscreen Display

Multiscreen display is now described with reference to FIG. 20. Picture signals loaded from the line sensor 17 shown in FIG. 16 and converted by the A-D converter 52 are not stored in the main memory 54 but skipped by the controller 55, to be stored in the display memory 56.

Figures 20, 21:
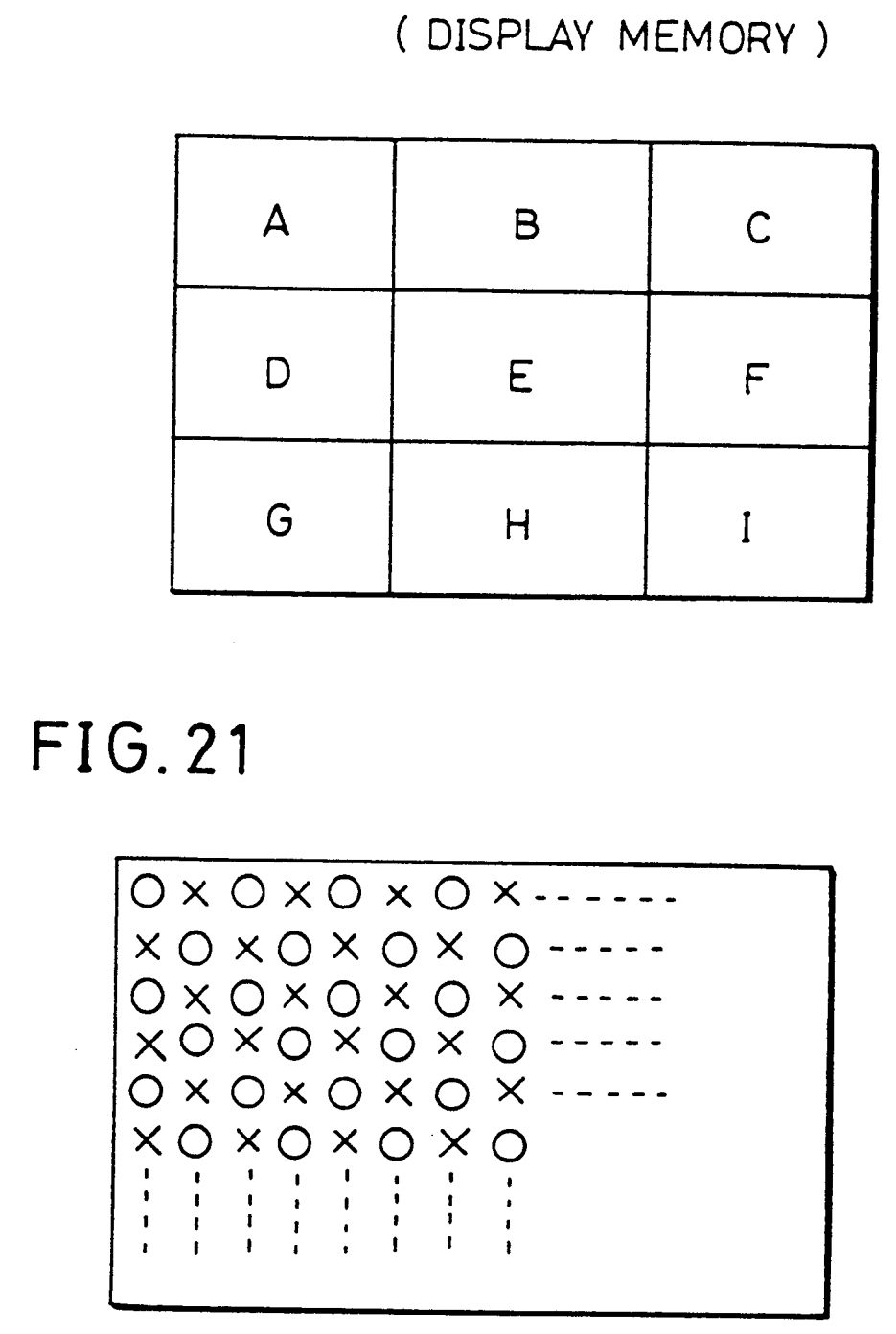

More specifically, a picture signal for a first picture displayed on the multiscreen is skipped and stored in a part A of the display memory 56 shown in FIG. 20, and then successively stored in parts B to I.

The line sensor 17 may not continuously scan the overall film 20. For example, the former may discretely scan the latter at two-stage intervals. Thus, it is possible to reduce the picture incorporation time. Although FIG. 20 shows a multiscreen with nine pictures, the present invention is also applicable to four pictures and 25 pictures.

(vii) Overlapping

Screen switching by overlapping is now described with reference to FIG. 21. Pictures from the display memory 56 are gradually wiped off to be newly switched to those from the main memory 54. When such screen switching is performed by overlapping, pictures from both memories are temporarily overlapped with each other.

First, the number of data from the display memory 56 is halved and further halved to gradually wipe off the pictures. For example, every other pixels are alternately culled out as shown in FIG. 21, for example.

Referring to FIG. 21, circles and crosses represent pixels of currently and subsequently reproduced frames. While picture signals for all pixels are displayed in the case of normal picture display, every other crossed pixels are culled out while remaining circled pixels, for example. Picture signals from the main memory 54 (signals for the next frame) are skipped-and inserted in the portions from which the crossed pixels are pulled out, to obtain an overlapped state. Then, values of picture data for the circled pixels are further halved and these portions are wiped off so that picture signals for the main memory 54 are also inserted in the portions of the circled pixels. Thus, the pictures from the display memory 56 are wiped off to be newly replaced by those from the main memory 54 (next frame).

(viii) Superimposition and Blue Backing

Superimposition and blue backing are now described. The controller 55 can freely rewrite the contents of the display memory 56. To this end, the controller 55 has the ROM 63 which previously stores fonts for characters, numerals and specific patterns (including those for changing the color of the overall screen to blue), and loads the font data in the display memory 56 at need. As the result, superimposition, blue backing and the like are enabled on a TV screen. The term "blue backing" means an operation for bluing a portion on the TV screen displaying no shot picture.

(ix) Scrolling

Scrolling of the screen is now described. In the main memory 54 shown at (iii) and (iv) in FIG. 17, pixel data are transferred to the display memory 56 to satisfy the following expression:

$$a(i, j)=b(i, j+1)\ (i=1\ to\ m,\ j=1\ to\ n-1)$$

The value j in the above expression is changed from 1 to (n−1), whereby a picture stored in the display memory 56 leftwardly slides by one pixel. It is possible to insert a monochrome back or a picture from the main memory 54 in the portion left by such movement of the picture.

(x) Rotation by 180°

An operation for rotating a picture by 180° is now described. In the main memory 54 shown at (iii) and (iv) in FIG. 17, the following calculation is made to switch data, thereby rotating the picture by 180°:

$$a(i, j)=b(m-i+1, n-j+1)\ (i=1\ to\ m,\ j=1\ to\ n)$$

(xi) White Balance (WB)

White balance is now described. A picture on a film illuminated by the light source 5 shown in FIG. 4(A) is taken by the line sensor 17 and signal-processed to be stored in the main memory 54.

At the same time, magnetic information recorded on the film is also read. The controller 55 reads light source information (WB) in shooting by a camera from the magnetic information. Namely, white balance for the picture data read from the main memory 54 is set on the basis of the light source information (WB) in shooting and a constant (stored in a ROM (not shown)) corresponding to every color temperature for red, green or blue in the matrix circuit 60.

(2) Second Embodiment

A second embodiment of the present invention is now described.

While the storage capacity of the main memory in the first embodiment is only for one screen, the film player is further improved in convenience if the main memory has capacity for two screens. In order to perform production such as panning or tilting as described with reference to FIG. 18 or 19(A), it is necessary to process picture data recorded in the main memory. When the main memory has capacity for only one screen, therefore, it is necessary to complete such processing of the picture data to record those of a next frame in the main memory. In other words, it is necessary to start scanning of the next frame after processing of the picture data of a preceding frame is completed.

When the main memory has capacity for two screens, it is possible to record the picture data of the next frame in a second screen during production of those of the preceding frame. Thus, it is possible to start scanning of the next frame before the preceding frame is completely processed.

Figure 22:
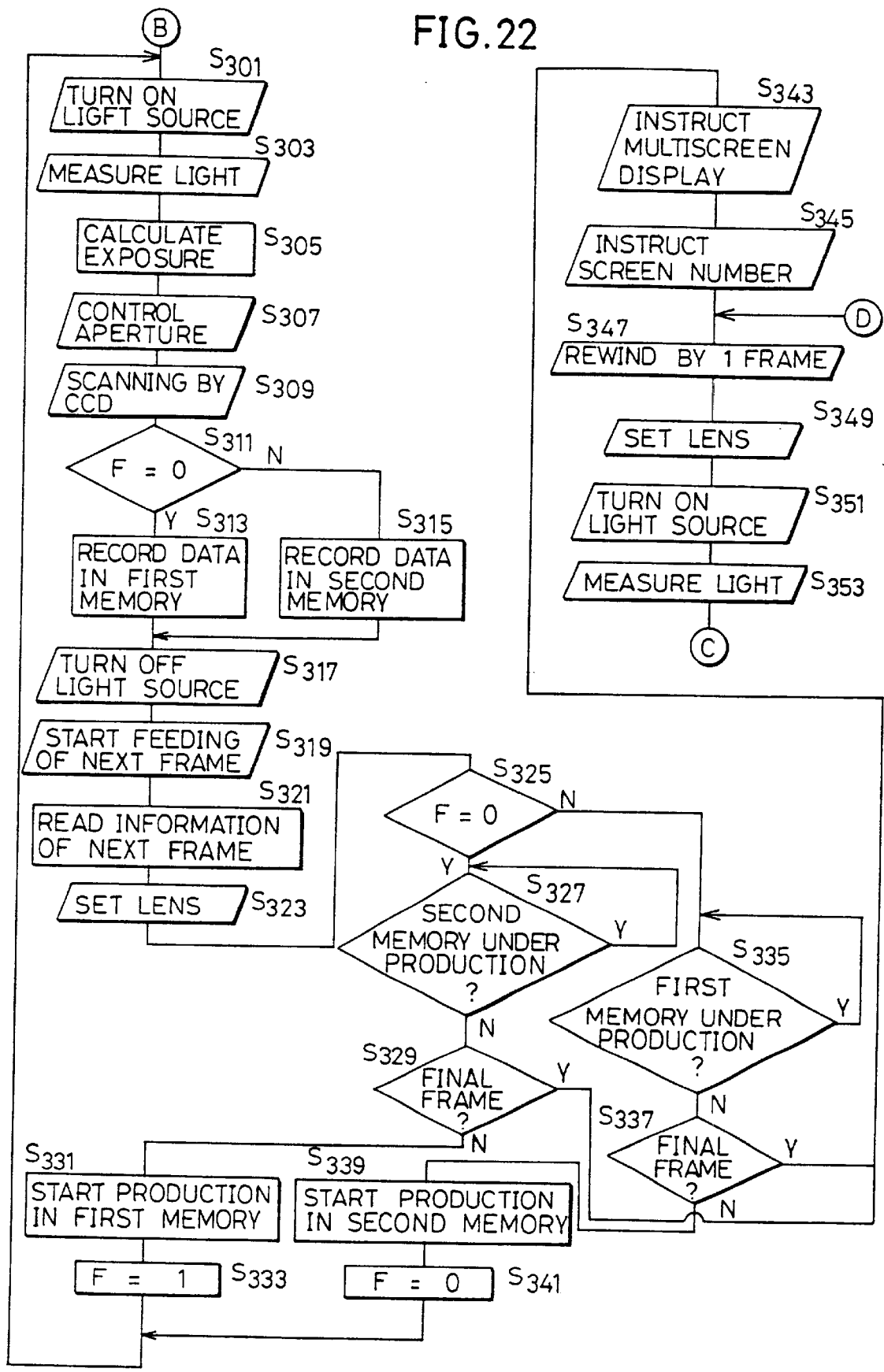
FIG. 22 is a flow chart showing the operation of a film player according to a second embodiment of the present invention.

With reference to FIG. 22, a scanning operation in the second embodiment of the present invention is now described in relation to a main memory having capacity for two screens. The basic operation of this embodiment is absolutely similar to that of the first embodiment, and hence redundant description is omitted. FIG. 22 is a flow chart showing a different part of the second embodiment corresponding to that of the first embodiment shown in FIG. 9. A storage region of the main memory for two screens is divided into first and second memories.

Figure 8:
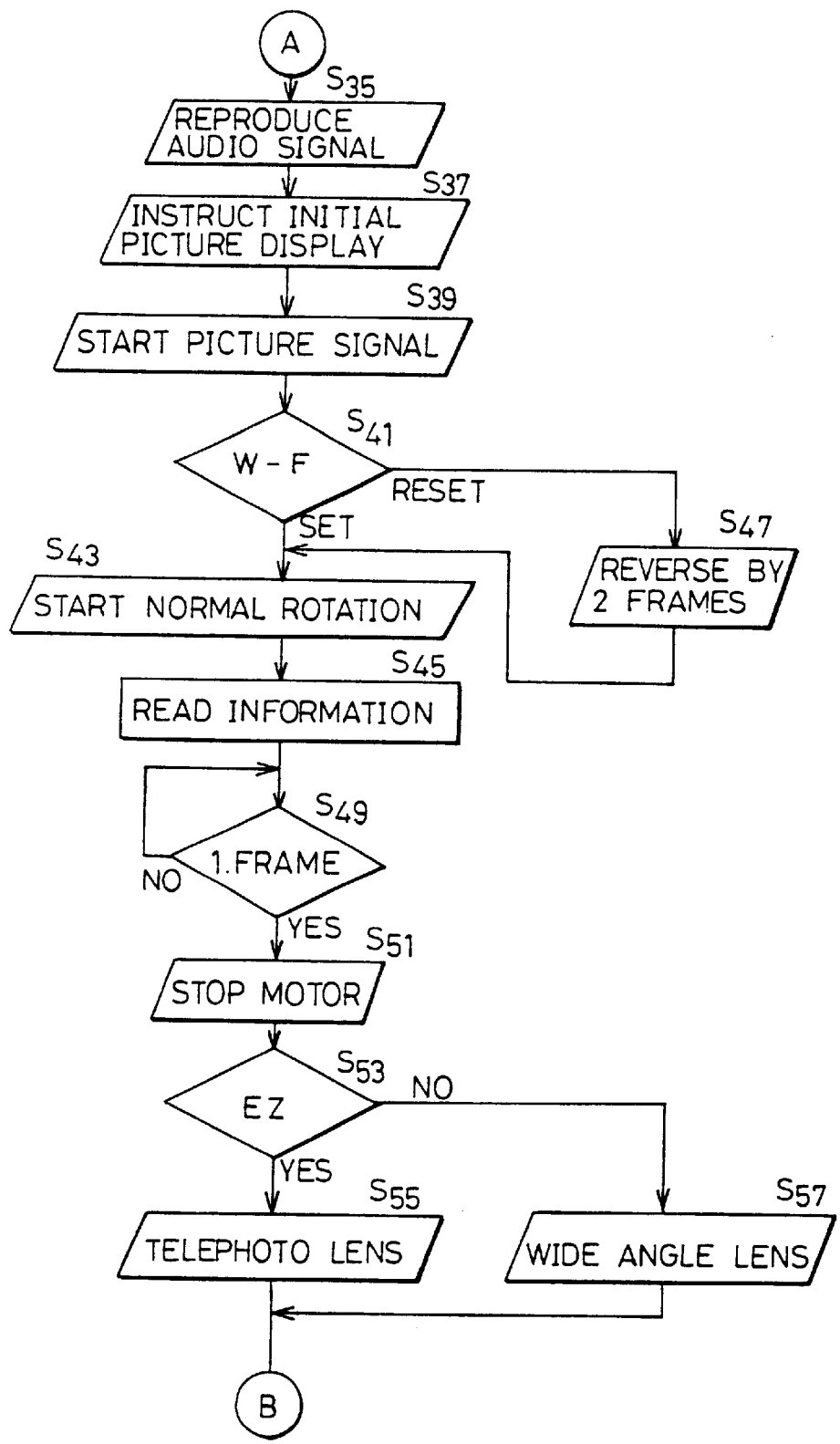
FIG. 8 is a flow chart showing the operation of the film player.

After a procedure similar to that of the first embodiment up to S55 (S57) shown in FIG. 8, a light source 5 is turned on, light on a film surface is measured, an exposure value is calculated, an aperture 22 is controlled and scanning by a CCD 17 is performed at S301 to S309. At S311, a determination is made as to whether or not a flag is zero, in order to judge whether picture data from the CCD 17 are to be recorded in the first memory or the second memory. If the flag is zero, the picture data are recorded in the first memory, while the same are recorded in the second memory if the flag is 1 (S313 or S315). Immediately after the film player is loaded with the film, this flag is zero for the first frame. After the picture data are recorded, the light source 5 is turned off and a next frame is previously moved to a pickup region while information of the next frame is simultaneously read (S317 to S321). At S323, a converter lens 23 is set on the basis of the read information of the next frame.

At S325, a determination is again made as to whether or not the flag is zero, and a further determination is made at S327 as to whether or not the second memory is under production if the flag is zero. If the determination at S327 is of no, a further determination is made as to whether or not a frame in the second memory is the final one (S329). If the determination is of no, production of the picture data recorded in the first memory at S313 is started (S331), and the flag is set at 1 (S333). Thereafter the process is returned to S301 to repeat the prescribed operation up to S301, and thereafter a determination is made at S311 that the flag is 1, and picture data of the next frame are recorded in the second memory. These operations are performed in parallel-with production of the picture data of the first memory.

When a determination is made at S325 that the flag is 1, on the other hand, production of the second memory is started at S339 and thereafter the process is returned to S301 to record the picture data of the next frame in the first memory.

When a determination is made at S329 or S337 that production of all frames is completed, the process is advanced to S343 for multiscreen display. The subsequent operation is similar to that in the first embodiment, and hence redundant description is omitted. In the multiscreen display, the picture data are recorded through either the first or second memory.

(3) Third Embodiment

A third embodiment of the present invention is now described with reference to sampling of a CCD line sensor.

Figure 23:
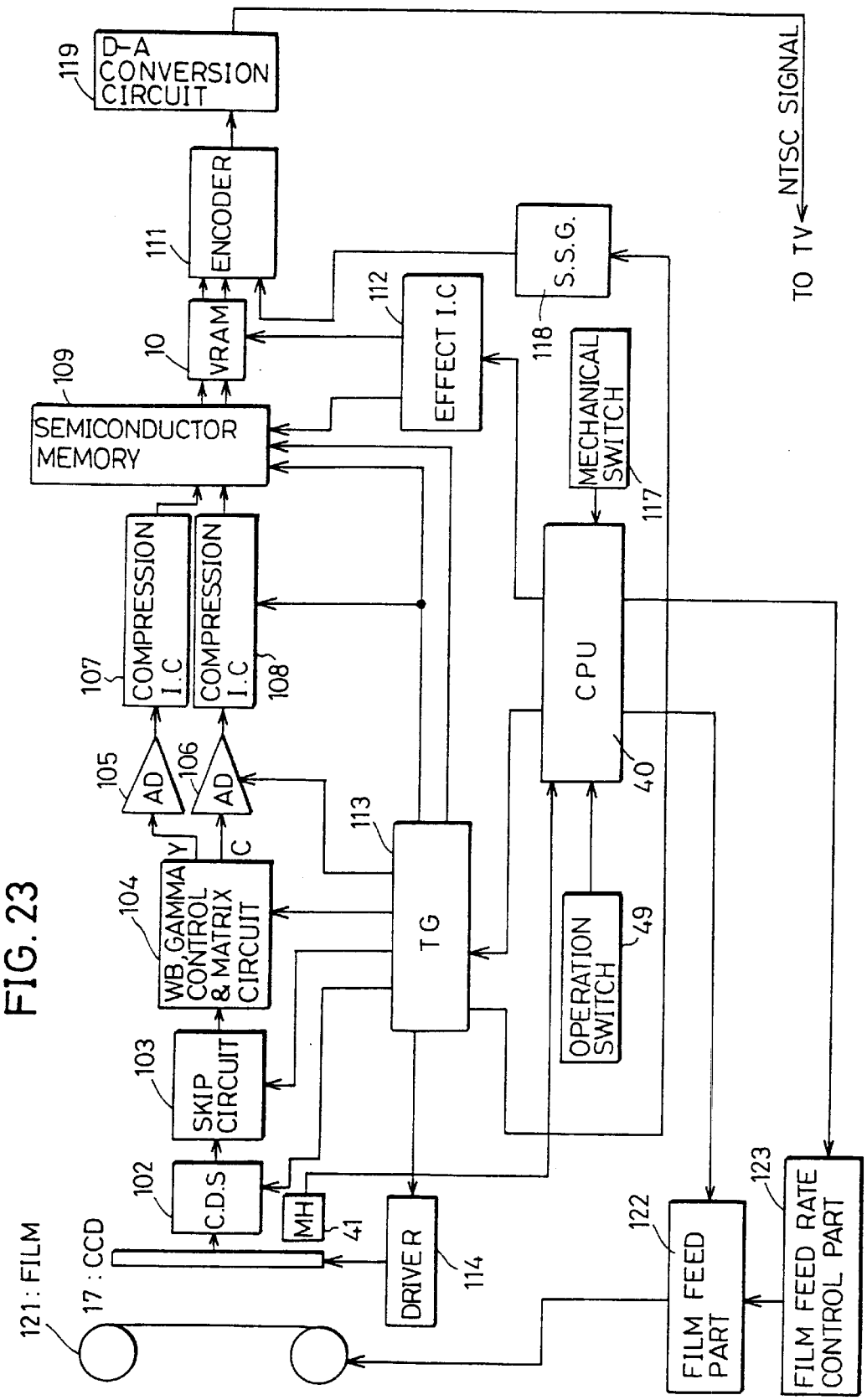
FIG. 23 is a block diagram-showing a principal part of a film player according to a third embodiment of the present invention.

FIG. 23 is a block diagram showing a principal part of a film player according to the third embodiment of the present invention.

Referring to FIG. 23, a picture on a film 121 is loaded by a CCD 17, and subjected to correlated double sampling in a CDS (correlated double sampler) 2. A CPU 40 judges transverse and vertical positions of the film 121 in shooting and makes a determination as to whether the picture is normal or panoramic, so that the data in the CCD 17 are skipped by a skip circuit 103 in response to the shooting state.

A driver 114 is driven by pulses from a timing generator 113 to read all data from the CCD 17, whereafter the film 121 is moved so that a next portion is read out. Also in this case, the amount of movement of the film 121 is varied with the shooting state. The skip circuit 103 skips the data in the CCD 17 not only in units of pixels but in units of lines.

The skipped data are passed through a WB (white balance), gamma control and matrix circuit 104, to be converted to a luminance signal Y and a color difference signal C.

The signals Y and C are A-D converted in A-D conversion circuits 105 and 106 respectively, and subjected to data compression by compression ICs 107 and 108, to be loaded in a semiconductor memory 109. The data compression is performed by a still picture compression method such as predictive coding, orthogonal conversion, Huffman coding or the like.

An effect IC 112 is a circuit for transferring an arbitrary part of the content of the semiconductor memory 109 to a VRAM 110, thereby enabling panning, tilting or electro-zooming.

The VRAM 110 is in one-to-one correspondence to a television, so that a picture written in the VRAM 110 is fed to an encoder 111 every field (1/60 sec.), combined with a signal from a synchronizing signal generator (SSG) 118 in the encoder 111 and D-A converted in a D-A conversion circuit 119 to an NTSC signal, to be transmitted to the television.

An operation switch 49 is adapted to recognize states of operating parts of the apparatus, while a mechanical switch 117 is adapted to recognize the states in the mechanism of the apparatus such as the position of the film 121, the position of the CCD 17 upon movement, and the like.

A magnetic read part 41 including a magnetic head for reading magnetic information recorded on the film 121 detects the format of the film 121 from the as-read magnetic information and outputs the content to the CPU 40.

The film 121 is fed by a film feed part 122 at a rate controlled by a film feed rate control part 123, so that desired taking is performed in the format of the film 121.

Figure 24:
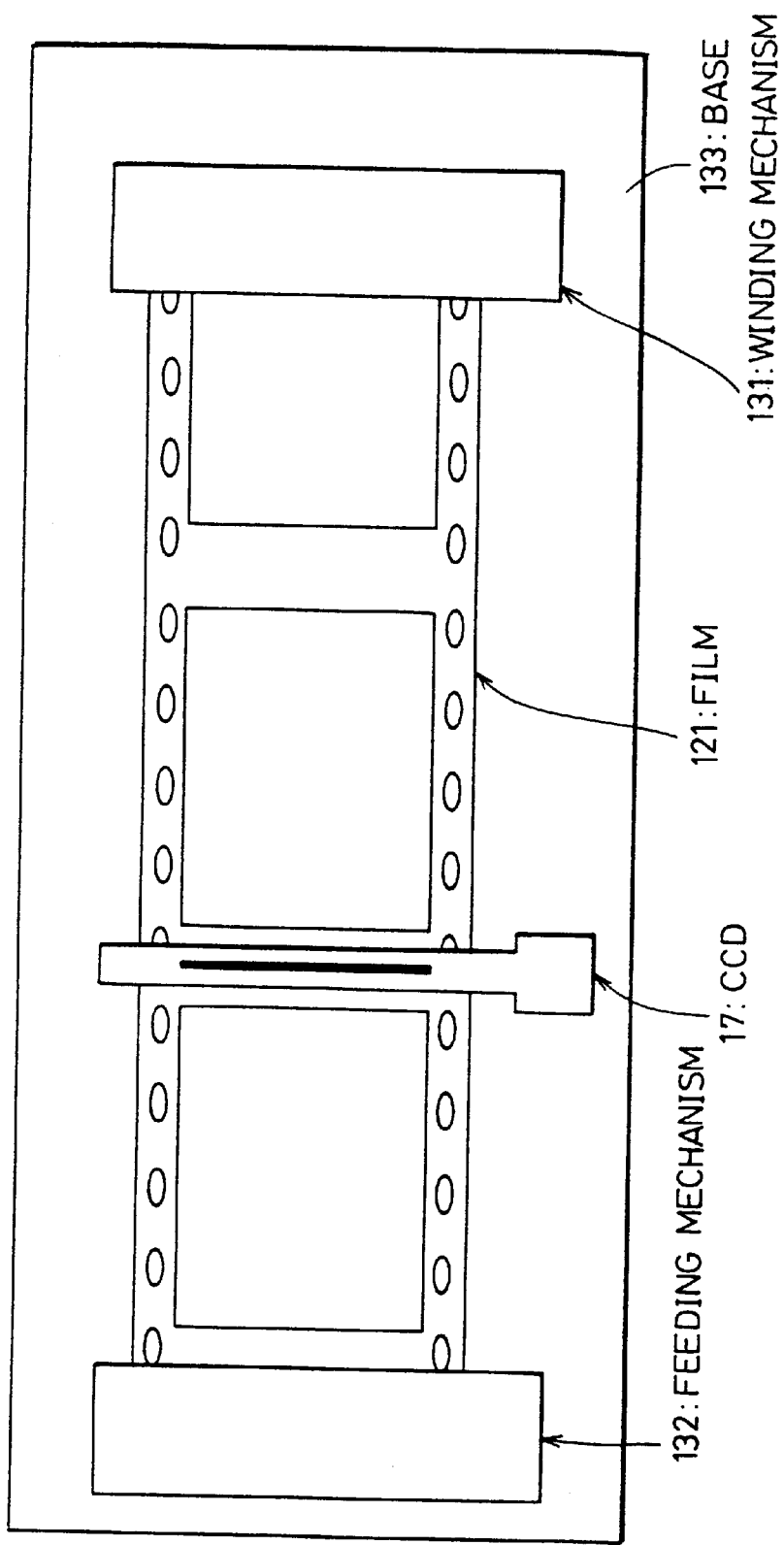
FIG. 24 illustrates a state of reading a picture from a film by a line CCD in the third embodiment of the present invention.

A part of the CCD 17 for reading the film 121 is now described with reference to FIG. 24.

The CCD 17 is fixed on a base 133, while the film 121 is driven by a winding mechanism 131 and passed under the CCD 17 so that the picture on the film 121 is loaded.

A feeding mechanism 132 applies tension to the film 121 in a direction opposite to that of winding, in order to prevent deflection.

Figure 25:
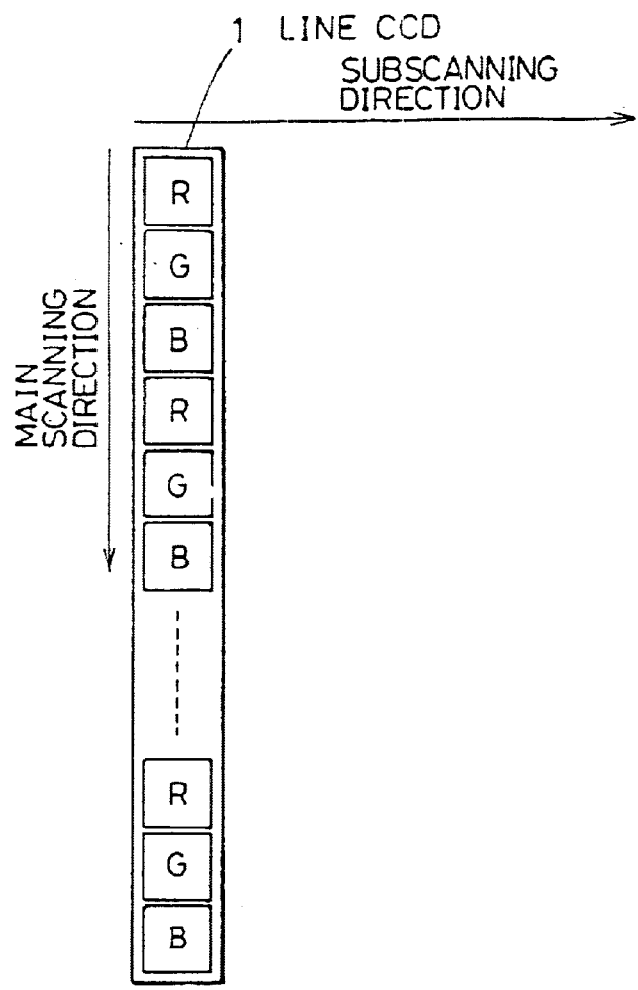
FIG. 25 illustrates the structure of the line CCD in the third embodiment of the present invention.

As shown in FIG. 25, the CCD 17 has 560 red pixels, 560 green pixels and 560 blue pixels, for example. Thus, the total number of the pixels is 16800 (5600×3). According to this embodiment, it is assumed that the vertical direction of the film 121 is a main scanning direction, and the direction of relative movement of the CCD 17 and the film 121 is a subscanning direction. A set of a red pixel, a green pixel and a blue pixel is hereafter denoted by symbol P.

Figure 26:
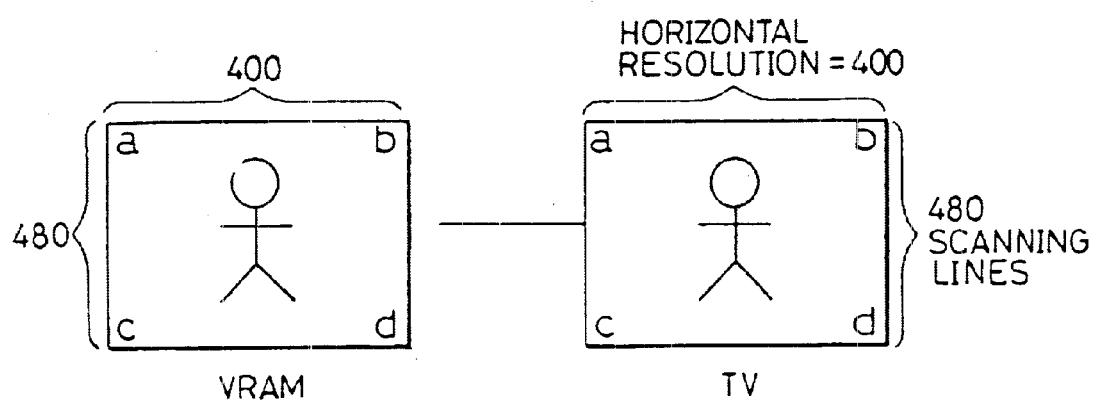
FIG. 26 illustrates relations between a VRAM and the number of scanning lines and horizontal resolution as to a picture outputted on a television.

FIG. 26 illustrates the structure of the memory VRAM 110 for outputting the picture of the film 121 on the television and the relation between the number of scanning lines and horizontal resolution upon output on the television. According to this embodiment, it is assumed that the number of scanning lines is 480 and horizontal resolution is 400 for the quality of the picture outputted on the television.

Referring to FIG. 26, the VRAM 110 is in one-to-one correspondence to the television, and the vertical direction of the VRAM 110 corresponds to 480 while the transverse direction thereof corresponds to 400. On the basis of these values, the number of pixels of the CCD sensor 17 and a read number S in the subscanning direction are set.

Figure 27A:
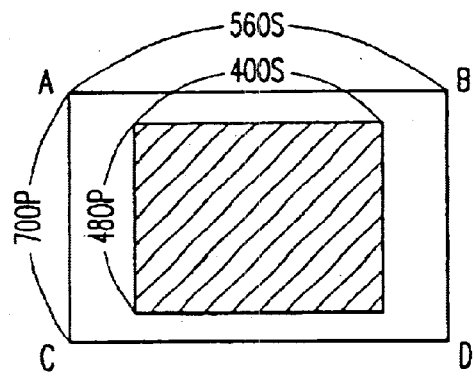
FIGS. 27(A) and 27(B) illustrate a scan method for a normal format transverse position.

FIG. 27(A) illustrates a scan method for a normal format transverse position. Symbols A, B, C and D denote the film 121, while slant lines show a portion outputted to the VRAM 110 to be reproduced on the television. The portion with slant lines is outputted (enlarged) and moved to enable panning or tilting, depending on which portion is outputted to the VRAM 110. Assuming that the enlargement ratio is 1.4 and a picture enlarged by 1.4 corresponds to the aforementioned picture quality, it is necessary to store the vertical direction (between A and C) of the film 121 with a pixel number of 480 P×1.4≈700P. Symbol P represents a set of a red pixel, a green pixel and a blue pixel as hereinabove described, and hence the actual pixel number is 700×3. Similarly, it is necessary to read the transverse direction (between A and B) with 400S×1.4=560S, where S represents the read number (step number).

Figure 27B:
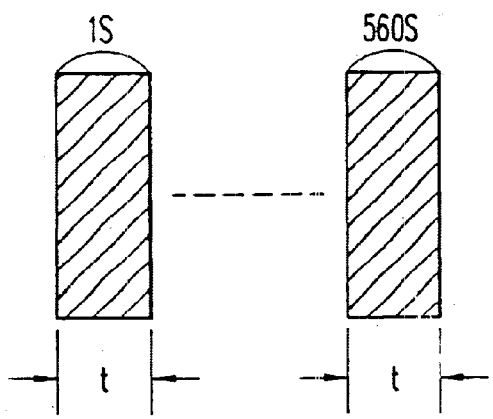

FIG. 27(B) shows a pickup region in a unit time t. The overall film is taken through 560 steps.

Figure 28A:
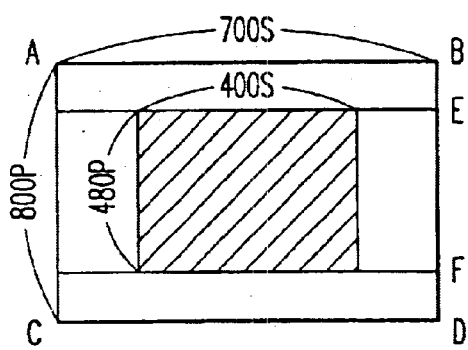
FIGS. 28(A) and 28(B) illustrate a scan method for a panoramic format vertical position.

FIG. 28(A) illustrates a scan method for a panoramic format transverse position. Similarly to the case shown in FIG. 27(A), symbols A, B, C and D denote the film 121, while slant lines show a portion reproduced on the television. The ratio of the vertical length of the film 121 to that of the portion projecting the picture (BD:EF) is 1.7:1.

Assuming that the picture on the portion with slant lines corresponds to the aforementioned picture quality, it is necessary to store the vertical direction (between A and C) of the film 121 with a pixel number of 480P×1.7≈800P. The actual pixel number is 800×3. Similarly, it is necessary to read the transverse direction (between A and B) with a read number of 400S×1.7≈700S.

Figure 28B:
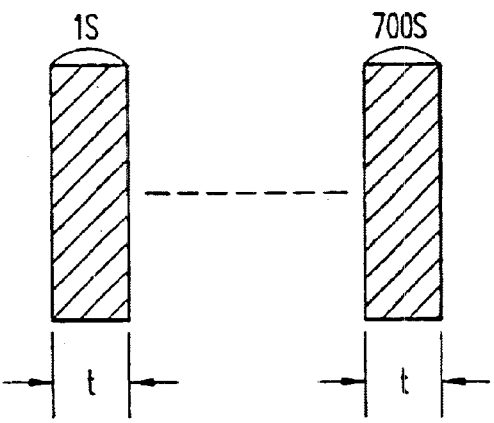

FIG. 28(B) shows a pickup region in a unit time t, and the overall film 121 is taken through 700 steps. It is assumed that the width of a portion taken in the unit time t is 560/700 on the basis of the normal format transverse position. The film feed rate control part 123 thus controls the film feed rate.

Figure 29A:
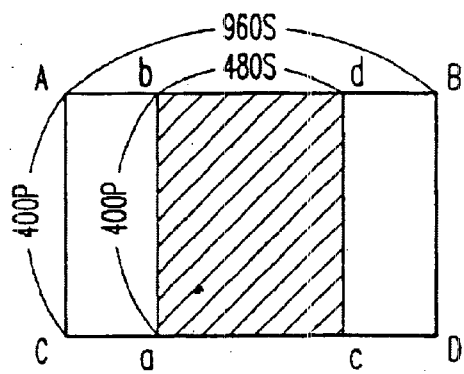
FIGS. 29(A) and 29(B) illustrate a scan method for a normal format vertical position.

FIG. 29(A) shows a scan method for a normal format vertical position. In this case, the vertical direction (between A and C) of the film 121 is outputted along a transverse direction on the television screen, and hence the same is stored with a pixel number of 400P. Then, the read number between A and B is obtained. In general, the aspect ratio of a film is 24 mm:36 mm=2:3, and that of a television is 3:4. From these aspect ratios, the ratio bd to AB is 1:2 and the read number is 480S×2=960S in the case of the vertical position.

Figure 29B:
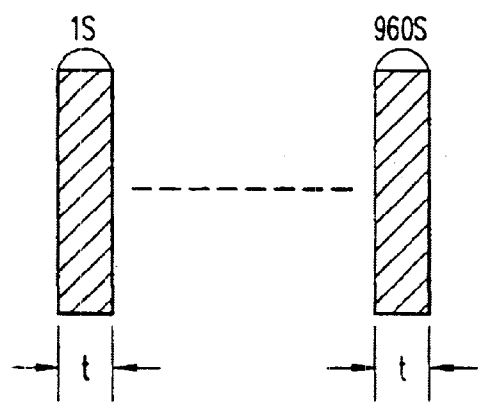

FIG. 29(B) shows a pickup region in a unit time t, and the overall film 121 is taken through 960 steps. It is assumed that the width of the portion taken in the unit time t is 560/960 on the basis of the normal format transverse position. The film feed rate control part 123 thus controls the film feed rate.

Figure 30A:
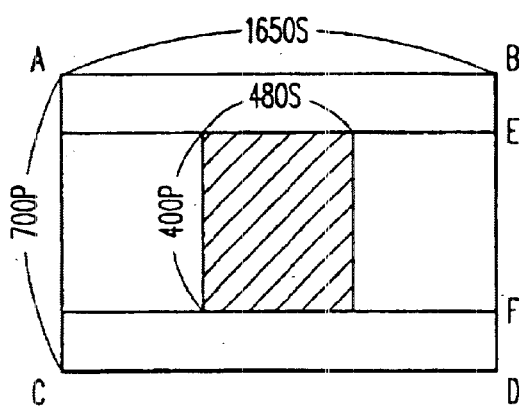
FIGS. 30(A) and 30(B) illustrate a scan method for a panoramic format vertical position.

FIG. 30(A) shows a scan method for a panoramic format transverse position. Similarly to the case shown in FIG. 27(A), symbols A, B, C and D denote a region of one frame of the film 121, and slant lines show a portion reproduced on the television. The ratio of the vertical length of the film 121 to that of the portion projecting the picture (BD:EF) is 1.7:1. Assuming that the picture on the portion with slant lines corresponds to the aforementioned picture quality, it is necessary to store the vertical direction (between A and C) of the film with a pixel number of 400P×1.7≈700P. The number 400P is multiplied by 1.7, in the same idea as that for the normal format vertical position. The actual pixel number is 700×3. Similarly, it is necessary to read the transverse direction (between A and B) with a read number of 480S×1.7×2≈1650S.

Figure 30B:
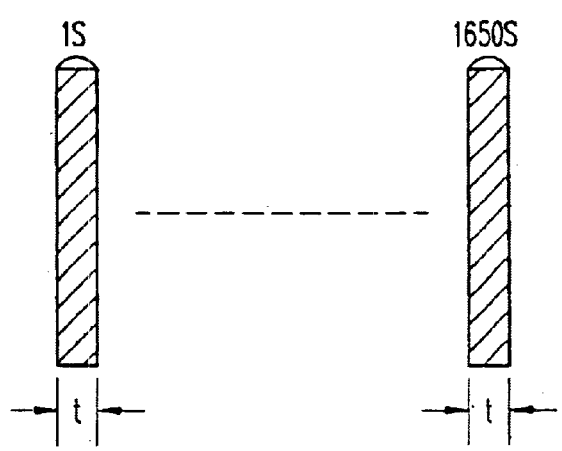

FIG. 30(B) shows a pickup region in a unit time t, and the overall frame of the film 121 is taken through 1650 steps. It is assumed that the width of the portion taken in the unit time t is 560/1650 on the basis of the normal format transverse position. The film feed rate control part 123 thus controls the film feed rate.

Figure 31:
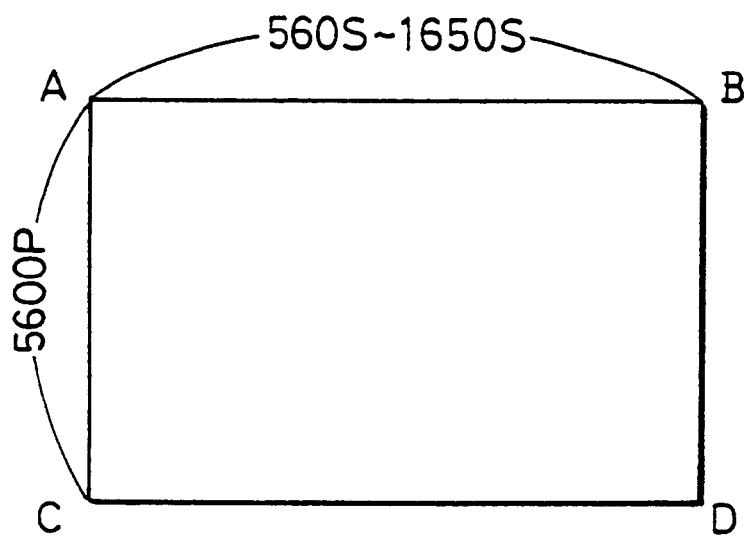
FIG. 31 illustrates ranges of pixel numbers and read numbers of a line sensor for respective formats.

FIG. 31 illustrates ranges of pixel numbers and read numbers of the CCD 17 based on the number of pixels incorporated in the memory 109 in each format and the read number. It is assumed that the CCD 17 has a pixel number of 5600, which is the least common denominator of the pixel numbers 700, 800, 400 and 700 required for the respective formats. Thus, a picture is taken with the pixel number of 5600 (the actual pixel number is 5600×3). In this case, the CCD 17 samples the following data:

(1) In the case of a normal format transverse position, only one of eight data is transmitted to the memory 109, while the remaining seven data are skipped by the skip circuit 103.

(2) In the case of a panoramic format transverse position, only one of seven data is transmitted to the memory 109, while the remaining six data are skipped by the skip circuit 103.

(3) In the case of a normal format vertical position, only one of 14 data is transmitted to the memory 109, while the remaining 13 data are skipped by the skip circuit 103.

(4) In the case of a panoramic format vertical position, only one of eight data is transmitted to the memory 109, while the remaining seven data are skipped by the skip circuit 103.

The read number in the film transverse direction is 560 to 1650, and the film feed rate is so controlled as to change the read number in response to the format. This also applies to the case of moving the CCD 17.

Figure 32:
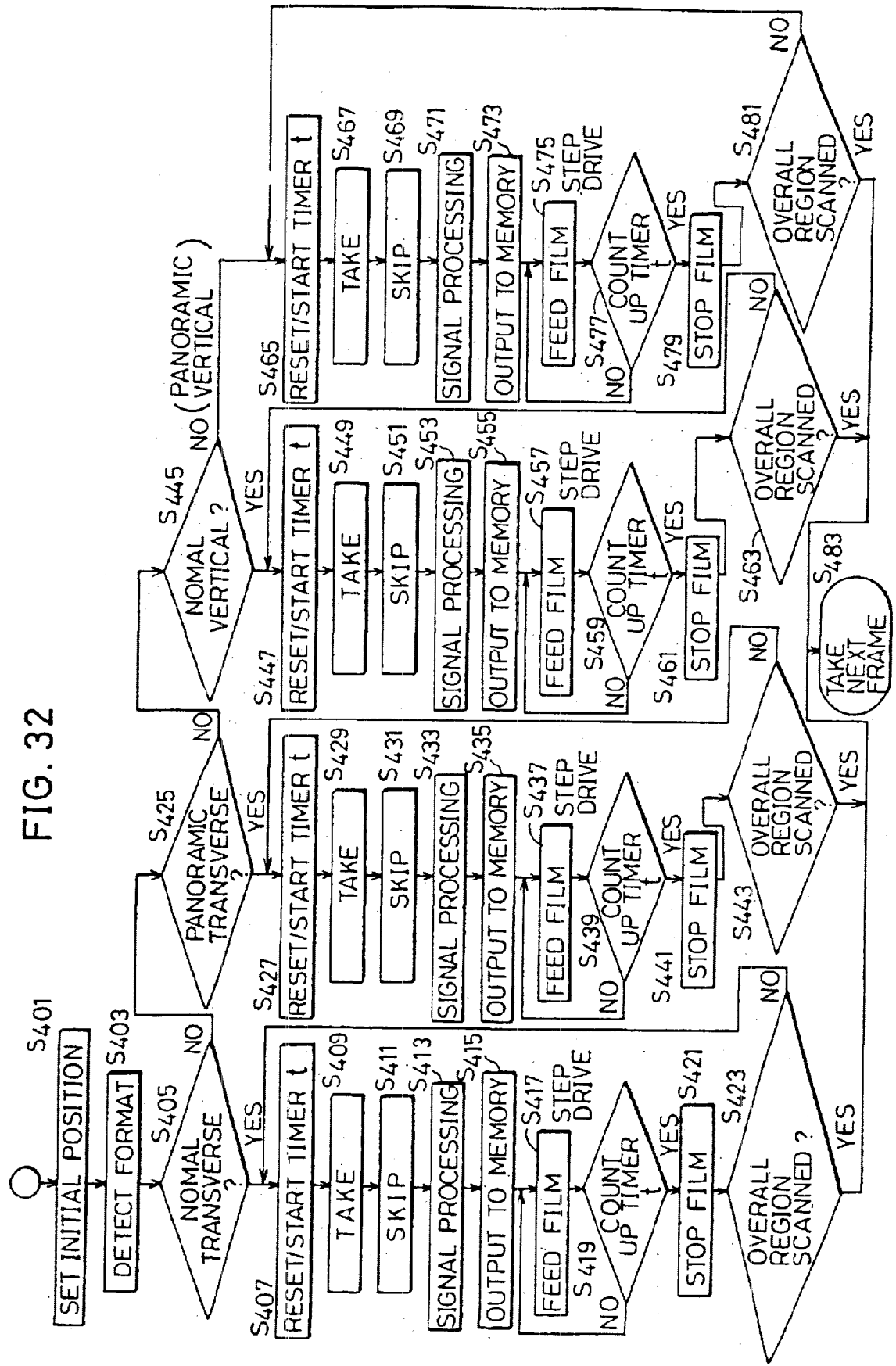
FIG. 32 is a flow chart for illustrating the operation of a film player according to the third embodiment of the present invention.

With reference to FIG. 32, the operation of the film player according to this embodiment is described, first in relation to a case where the CCD 17 is fixed. When the film 121 is inserted in a receiving part (not shown) of the film player and set in an initial position, a magnetic read part 41 detects the format in shooting of each frame from a lead portion of the film 121 (S401 to S405). Depending on the result of such detection, the program branches to a step S405, S425, S445 or S465.

When the frame of the film 121 is in the format of a normal transverse position (yes at S405), a timer t is reset/started so that a picture of the frame is taken by the CCD 17 (S407 and S409). Then, the data are skipped by the skip circuit 103 as hereinabove described, and subjected to signal processing by the WB, gamma correction and matrix circuit 104 and transmitted to the memory 109 (S411 to S415). Then the film 121 is fed for a prescribed time at a prescribed rate by the film feed part 122 and the film feed rate control part 123. Thereafter feeding of the film 121 is stopped, and this is repeated until the overall frame thereof is completely scanned (S417 to S423).

When the frame on the film 121 is in a panoramic transverse position, a normal vertical position or a panoramic vertical position, steps following S427, S447 or S465 are repeated. Contents of these steps are similar to those for the normal transverse position except that the film 121 is driven at each of the aforementioned film feed rates, and hence redundant description is omitted.

Figure 33:
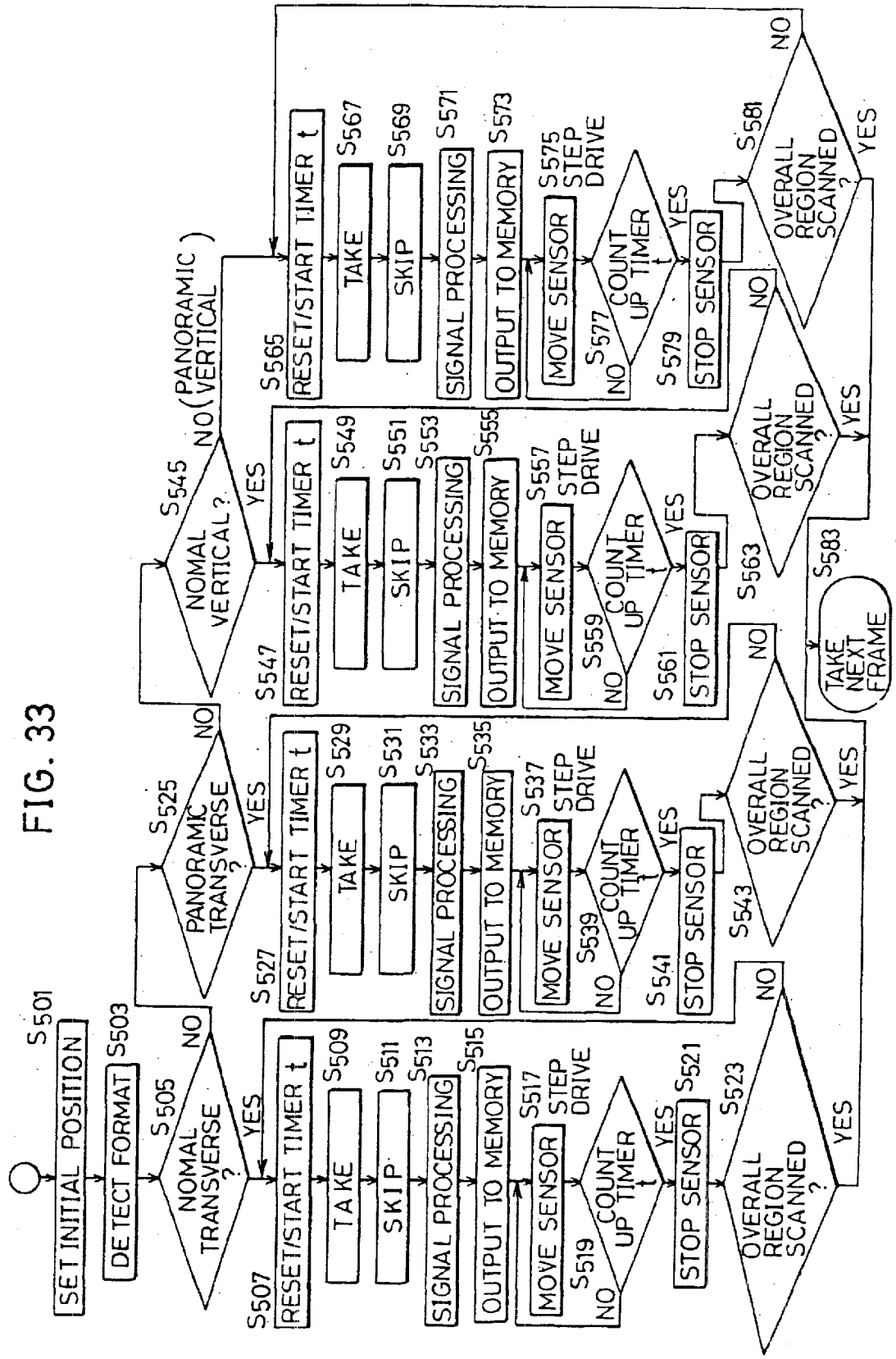
FIG. 33 is a flow chart for illustrating the operation of a modification of the third embodiment.

A modification of this embodiment is now described. In the modification, the film 121 is fixed while the CCD 17 is moved in place thereof. FIG. 33 illustrates a flow chart of this modification. The content of FIG. 33 is substantially similar to that shown in FIG. 32 except that the film feed rate control in FIG. 32 is replaced by moving rate control for the CCD 17, and hence redundant description is omitted.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus comprising:
an image sensor which senses an image at one of a plurality of selected resolutions and produces image data;
a data reader which reads image information corresponding to said sensed image; and
a selector which selects one of said resolutions based on the image information read by said data reader.

2. The image processing apparatus as claimed in claim 1, wherein the image is recorded in a developed film.

3. The image processing apparatus as claimed in claim 2, wherein the image information corresponding to the image is recorded on the developed film.

4. The image processing apparatus as claimed in claim 2, wherein the image information corresponding to the image includes film format information.

5. The image processing apparatus as claimed in claim 1, wherein the selector selects intervals at which the image sensor senses the image so as to determine the resolution.

6. The image processing apparatus as claimed in claim 5, wherein the image and the image sensor are relatively movable.

7. The image processing apparatus as claimed in claim 6, further comprising:
a scanning device which moves the image across the image sensor.

8. The image processing apparatus as claimed in claim 6, wherein the selector selects the speed of the relative motion so as to determine the resolution.

9. The image processing apparatus as claimed in claim 1, wherein the selector includes a controller that inputs image data produced by the image sensor and skips a part of the input image data so as to control the resolution.

10. The image processing apparatus as claimed in claim 1, further comprising:
a video RAM; and
wherein the image data at the resolution selected by the selector is sent to the video RAM.

11. An image processing apparatus for processing an image based on image information corresponding to the image, said apparatus comprising:
an image sensor which senses an image and produced image data;
a data reader which reads image information corresponding said sensed
a data processor which varies the amount of image data based on a relationship between the image information read by said data reader and a resolution of a display device on which said image is displayed, and outputs the image data.

12. The image processing apparatus as claimed in claim 11, wherein the data processor inputs the image data produced by the image sensor and skips a part of the input image data so as to vary the data amount.

13. The image processing apparatus as claimed in claim 11, further comprising:
a memory which stores the processed image data output by the data processor.

14. The image processing apparatus as claimed in claim 11, wherein the image processing apparatus is connected with a monitor, and said monitor displays a screen corresponding to the processed image data output by the data processor.

15. The image processing apparatus of claim 11, wherein the image data is output in the form of an NTSC signal.

16. The image processing apparatus of claim 11, wherein the amount of image data is varied by skipping image data.

17. The image processing apparatus of claim 11, further comprising a compressor that compresses the image data.

18. An image processing method, comprising the steps of:
sensing an image recorded on a recording medium;
producing image data from the sensed image;
reading image information corresponding to the image; and
varying the amount of image data based on the image information read during said reading step.

19. The image processing method as claimed in claim 18, wherein the reading step specifies a film type of the image.

20. An image processing method, comprising the steps of:
sensing an image recorded on a recording medium;
producing image data from the sensed image;
reading image information corresponding to said sensed image; and
controlling resolution of the image data based on the image information read during said reading step.

21. An image processing apparatus, comprising:
an image sensor which senses an image recorded on a recording medium and produces image data;
a data reader which reads image information corresponding to said sensed image;
a data processor which varies the amount of image data based on the image information read by said data reader; and
a memory which stores the processed image data.

22. A digital still image recording apparatus having at least three modes of processing image data, comprising:
an image sensor which senses an image and produces image data;
a selector which selects one of the modes at each sensing by said image sensor;
a processor which varies the amount of image data based on the mode selected by said selector; and
a memory which stores the processed image data.

23. A digital still image recording apparatus having at least three modes of processing image data, comprising:
an image sensor which senses an image and produces image data;
a selector which selects one of the modes at each sensing by said image sensor; and
a processor which extracts a part of image data that forms a part of the sensed image so as to vary the amount of image data when at least one of the three modes is selected by said selector; and
a memory controller which causes a memory to store the processed image.

24. The digital still image recording apparatus as claimed in claim 23, further comprising:
an information memory which stores information with respect to the amount of image data; and
wherein the selector selects a mode based on the information stored in the information memory.

25. The digital still image recording apparatus as claimed in claim 23, wherein the processor skips a part of the image data so as to vary the amount of image data.

26. The digital still image recording apparatus as claimed in claim 23, wherein the image sensor is a charge-coupled device.

27. The digital still image recording apparatus as claimed in claim 23, wherein the memory is a semi-conductor memory.

28. The digital still image recording apparatus as claimed in claim 23, further comprising:

a white balance circuit which modulates white balance of the image data.

29. The digital still image recording apparatus as claimed in claim 23, further comprising:

a Gamma control circuit which controls Gamma of the image data.

30. The digital still image recording apparatus as claimed in claim 23, wherein the digital still image recording apparatus us connected with a monitor, and said monitor displays the processed image data stored in the memory.

31. The digital still image recording apparatus as claimed in claim 30, further comprising:

a D/A converter which converts the image data to a NTSC signal, and wherein said monitor displays the image based on the NTSC signal.

32. The digital still image recording apparatus as claimed in claim 30, further comprising:

a modification device which modifies image data output from the memory, and wherein said monitor displays the modified image data.

* * * * *